United States Patent
Sato et al.

(10) Patent No.: US 12,170,544 B2
(45) Date of Patent: Dec. 17, 2024

(54) OPTICAL SIGNAL PROCESSING CIRCUIT, OPTICAL RECEPTION APPARATUS, AND OPTICAL SIGNAL PROCESSING METHOD

(71) Applicant: NEC Corporation, Tokyo (JP)

(72) Inventors: Masaki Sato, Tokyo (JP); Hidemi Noguchi, Tokyo (JP); Junichi Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1 day.

(21) Appl. No.: 17/766,314

(22) PCT Filed: Oct. 5, 2020

(86) PCT No.: PCT/JP2020/037766
§ 371 (c)(1),
(2) Date: Apr. 4, 2022

(87) PCT Pub. No.: WO2021/070790
PCT Pub. Date: Apr. 15, 2021

(65) Prior Publication Data
US 2024/0056197 A1    Feb. 15, 2024

(30) Foreign Application Priority Data
Oct. 10, 2019  (JP) ................. 2019-186763

(51) Int. Cl.
*H04B 10/61* (2013.01)
*H04B 3/06* (2006.01)

(52) U.S. Cl.
CPC ............. *H04B 10/616* (2013.01); *H04B 3/06* (2013.01)

(58) Field of Classification Search
None
See application file for complete search history.

(56) References Cited

U.S. PATENT DOCUMENTS

2013/0195455 A1    8/2013   Jansen et al.

OTHER PUBLICATIONS

Sato et al., "Mitigation of Inter-Subcarrier Linear Crosstalk with Fixed Frequency-Domain Equalizer assisted MIMO for High-Order Modulation", Sep. 24, 2019, 45th European Conference on Optical Communication (ECOC 2019), Institution of Engineering and Technology—ISBN 978-1-83953-185-9, pp. 1-4 (Year: 2019).*
International Search Report for PCT Application No. PCT/JP2020/037766, mailed on Dec. 22, 2020.

(Continued)

*Primary Examiner* — David W Lambert

(57) ABSTRACT

An optical signal processing circuit (1) includes: an FDE-MIMO equalizer (2) configured to generate, based on continuous subcarrier signals including a target subcarrier signal in an optical multicarrier signal to be received, the continuous subcarrier signals that have been subjected to frequency-domain MIMO equalization processing; and a TDE-MIMO equalizer (3) configured to generate, based on the continuous subcarrier signals that have been subjected to the frequency-domain MIMO equalization processing, the target subcarrier signal that has been subjected to time-domain MIMO equalization processing.

14 Claims, 16 Drawing Sheets

(56) References Cited

OTHER PUBLICATIONS

Fukutaro Hamaoka et al., "Experimental Demonstration of Crosstalk Compensation for Super High Density Multi-Carrier POM-QPSK Signal by MIMO Processing", B-10-32, P.206, Proceedings (2) of the 2014 Communications Society Conference of the Institute of Electronics, Information and Communication Engineers.
Sato, Masaki et al., "Mitigation of Inter-Subcarrier Linear Crosstalk with Fixed Frequency-Domain Equalizer assisted MIMO for High-Order Modulation", 45th European Conference on Optical Communication (ECOC 2019), Sep. 24, 2019, ISBN 978-1-83953-185-9, pp. 1-6.
Sato, Masaki et al., "Mitigation of Inter-Subcarrier Linear Crosstalk with MIMO equalizer", 25th Optoelectronics and Communications Conference (OECC), Oct. 5, 2020, ISSN 2166-8884, pp. 1-7.

* cited by examiner

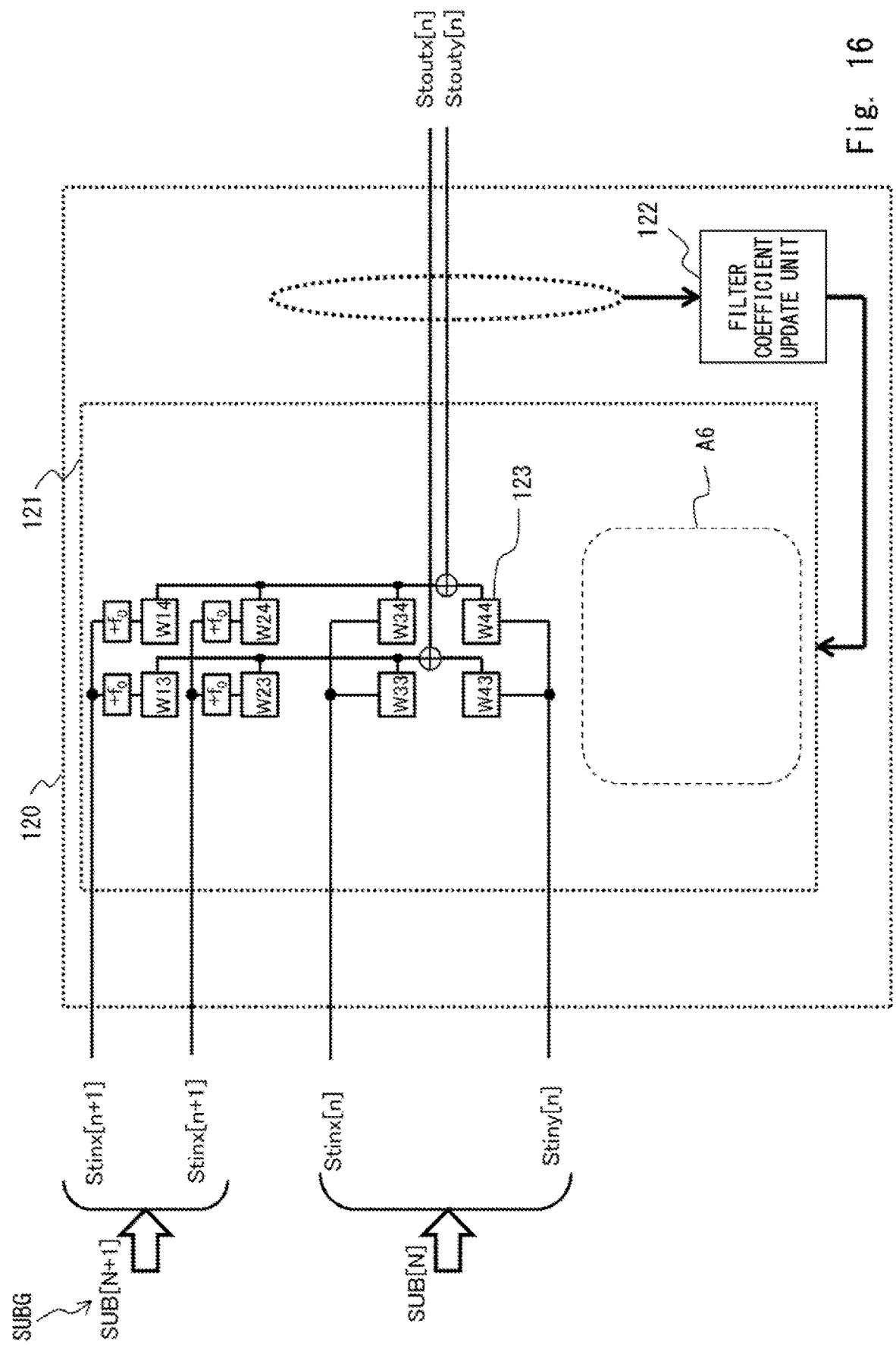

OPTICAL SIGNAL PROCESSING CIRCUIT, OPTICAL RECEPTION APPARATUS, AND OPTICAL SIGNAL PROCESSING METHOD

This application is a National Stage Entry of PCT/JP2020/037766 filed on Oct. 5, 2020, which claims priority from Japanese Patent Application 2019-186763 filed on Oct. 10, 2019, the contents of all of which are incorporated herein by reference, in their entirety.

TECHNICAL FIELD

The present invention relates to an optical signal processing circuit, an optical reception apparatus, and an optical signal processing method.

BACKGROUND ART

Digital coherent technology is used in high-capacity optical communication systems exceeding 100 Gbps (Giga-bit per second) today. In such optical communication systems, communications using multilevel modulation formats such as QPSK (Quadrature Phase Shift Keying) and 16QAM (Quadrature Amplitude Modulation) are in practical use. Further, higher-order multilevel modulation systems such as 32 QAM and 64 QAM have been developed in order to implement a further increase in capacity.

In parallel with development towards higher capacity by use of multilevel formats, research and development of transmission technology that improves the spectral efficiency by narrowing the signal band and adopting wavelength-division multiplexing (WDM) are actively underway. A major example is Nyquist pulse shaping transmission that achieves a narrower signal spectrum compared with NRZ (Non Return to Zero) transmission that has been widely used. Further, advanced signal band narrowing technology such as super-Nyquist pulse phasing transmission that further narrows the signal bandwidth than the signal's baudrate is being studied. In this manner, besides multilevel formats, an approach of improving the transmission capacity per optical fiber by narrowing the signal band and making the channel spacing denser in wavelength-division multiplexing transmission is also regarded as important.

Particularly, in an optical transmission system of 1 Tbps (Tera bit per second) or higher, subcarrier multiplexing that achieves 1 Tbps transmission by using wavelength division multiplexing of a plurality of subcarriers is effective in consideration of feasibility. Since the spectral efficiency increases as the subcarrier spacing is denser, technology that allows transmission with narrow subcarrier multiplexing spacing is significant. Therefore, development of technology that enables WDM transmission with dense subcarrier spacing is actively pursued. One such technology that enables WDM transmission with dense subcarrier spacing is disclosed in Non Patent Literature 1, for example.

The optical transmission system of Non Patent Literature 1 is a communication system that transmits digital coherent dual-polarization multilevel optical signals. In the optical transmission system of Non Patent Literature 1, subcarrier signals in NRZ format are transmitted by using WDM with spacing of less than the baudrate, and, crosstalk between subcarriers is reduced at the receiving end by performing linear equalization by MIMO (Multi Input Multi Output) of signals of adjacent subcarriers, so that the subcarrier signals overlapping on a frequency axis are separated into original signals.

CITATION LIST

Non Patent Literature

Non Patent Literature 1: Hamaoka Fukutaro et al., "Experimental Demonstration of Crosstalk Compensation for Super High Density Multi-Carrier PDM-QPSK Signal by MIMO Processing", B-10-32, P. 206, Proceedings (2) of the 2014 Communications Society Conference of the Institute of Electronics, Information and Communication Engineers

SUMMARY OF INVENTION

Technical Problem

In an optical transmission system of 1 Tbps or more, as disclosed in Non Patent Literature 1, crosstalk between subcarrier signals is reduced by performing MIMO processing on the receiving side. However, there is a problem that the circuit size on the receiving side may be increased when subcarrier signals to be multiplexed increase.

In view of the problem described above, an object of the present disclosure is to provide an optical signal processing circuit, an optical reception apparatus, and an optical signal processing method that are capable of minimizing an increase in circuit size.

Solution to Problem

An optical signal processing circuit according to the present disclosure includes: a frequency-domain MIMO equalizer configured to generate, based on continuous subcarrier signals including a target subcarrier signal in an optical multicarrier signal to be received, the continuous subcarrier signals that have been subjected to frequency-domain MIMO equalization processing; and a time-domain MIMO equalizer configured to generate, based on the continuous subcarrier signals that have been subjected to the frequency-domain MIMO equalization processing, the target subcarrier signal that has been subjected to time-domain MIMO equalization processing.

An optical reception apparatus according to the present disclosure includes an optical receiver configured to receive an optical multicarrier signal, a plurality of frequency-domain MIMO equalizers, and a plurality of time-domain MIMO equalizers, in which each of the plurality of frequency-domain MIMO equalizers generates, based on continuous subcarrier signals including a target subcarrier signal selected for each of the frequency-domain MIMO equalizers in the optical multicarrier signal to be received, the continuous subcarrier signals that have been subjected to frequency-domain MIMO equalization processing, and each of the plurality of time-domain MIMO equalizers generates, based on the continuous subcarrier signals that have been subjected to the frequency-domain MIMO equalization processing, the target subcarrier signal that has been subjected to time-domain MIMO equalization processing.

An optical signal processing method according to the present disclosure includes: generating, based on continuous subcarrier signals including a target subcarrier signal in an optical multicarrier signal to be received, the continuous subcarrier signals that have been subjected to frequency-domain MIMO equalization processing; and generating, based on the continuous subcarrier signals that have been subjected to the frequency-domain MIMO equalization processing, the target subcarrier signal that has been subjected to time-domain MIMO equalization processing.

Advantageous Effects of Invention

According to the present disclosure, it is possible to provide an optical signal processing circuit, an optical reception apparatus, and an optical signal processing method that are capable of minimizing an increase in circuit size.

BRIEF DESCRIPTION OF DRAWINGS

FIG. 16 is a configuration diagram showing a configuration of the TDE-MIMO equalizer according to the second example embodiment.

DESCRIPTION OF EMBODIMENTS

Example embodiments will be described hereinafter with reference to the drawings. The same elements are denoted by the same reference symbols throughout the drawings, and redundant descriptions will be omitted as necessary. Note that arrows shown in the configuration diagrams (block diagrams) are merely examples for the purpose of descriptions and do not limit the type or direction of a signal.

(Study of Non Patent Literature 1)

First, the inventors found, according to their studies of the technique disclosed in Non Patent Literature 1, that Non Patent Literature 1 is not satisfactory in the following points. For example, in an optical transmission system that allows flexible transmission path selection such as a transmission system using ROADM (Reconfigurable Optical Add/Drop Multiplexer) equipment, it is common to define a signal with a plurality of multiplexed subcarriers as one channel and performs path control on a channel-by-channel basis.

Then, a signal spectrum is cut off due to the characteristics of an optical switch such as a WSS (Wavelength Selective Switch) mounted on a ROADM device, which causes the signal band to be narrowed. Besides the ROADM device, a signal is affected by restrictions on the analog front-end bandwidth of a transmitter-receiver and asymmetric spectrum narrowing due to source frequency offset.

Although Non Patent Literature 1 discloses a MIMO equalization scheme for wavelength-division multiplexing of subcarrier signals in NRZ format having a wide signal band, such wide-band subcarrier signals in NRZ format are significantly affected by band narrowing that occurs when passing through the ROADM device. In the event of signal spectrum narrowing or asymmetric band narrowing, the filter characteristics required for a MIMO equalizer are extremely steep in order to effectively cancel the crosstalk between overlapping subcarriers and accurately compensate for waveform distortion caused by the band narrowing or the like, which are the intended purpose of the MIMO equalizer.

Therefore, in the technique described in Non Patent Literature 1, the number of taps of FIR (Finite Impulse Response) filters that constitute the MIMO equalizer increases, which causes an increase in circuit size and degradation of the convergence performance of coefficient optimization using CMA (Constant Modulus Algorithm) or the like of the MIMO equalizer, leading to significant deterioration of the characteristics.

(Study of Comparative Example)

Figure 1:
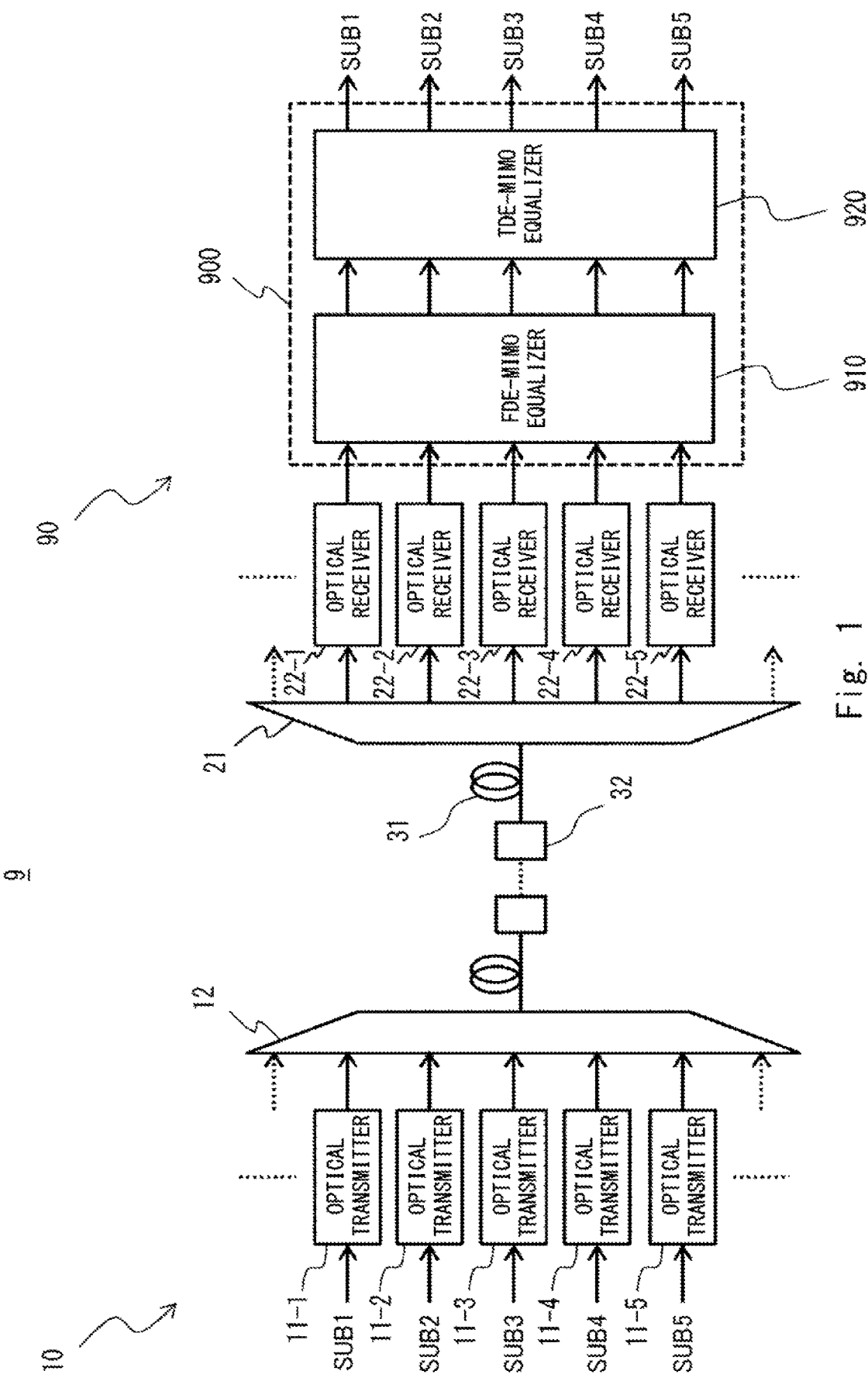
FIG. 1 is a configuration diagram showing a configuration of a WDM optical transmission system according to a comparative example.

Next, a comparative example for solving the aforementioned problem of Non Patent Literature 1 will be studied. FIG. 1 shows a configuration of a WDM optical transmission system according to the comparative example, and FIG. 2 shows a configuration of a subcarrier-multiplexed signal transmitted and received by the WDM optical transmission system according to the comparative example.

As shown in FIG. 1, a WDM optical transmission system 9 according to the comparative example includes an optical transmission apparatus 10 and an optical reception apparatus 90 that perform optical communication via an optical fiber transmission line 31. An ROADM device 32 is disposed in the optical fiber transmission line 31. The optical transmission apparatus 10 includes a plurality of optical transmitters 11 (11-1 to 11-5 in this example) that convert a plurality of respective subcarrier signals (SUB) into optical signals to be transmitted, and a multiplexer 12 that multiplexes a plurality of generated optical signals. The optical reception apparatus 90 includes a demultiplexer 21 that demultiplexes a received optical signal into a plurality of subcarrier signals, a plurality of optical receivers 22 (22-1 to 22-5 in this example) that convert a plurality of respective subcarrier signals, which are optical signals, into signals that can be processed, and a hybrid MIMO equalizer 900 that performs MIMO equalization processing by two systems.

Figure 2:
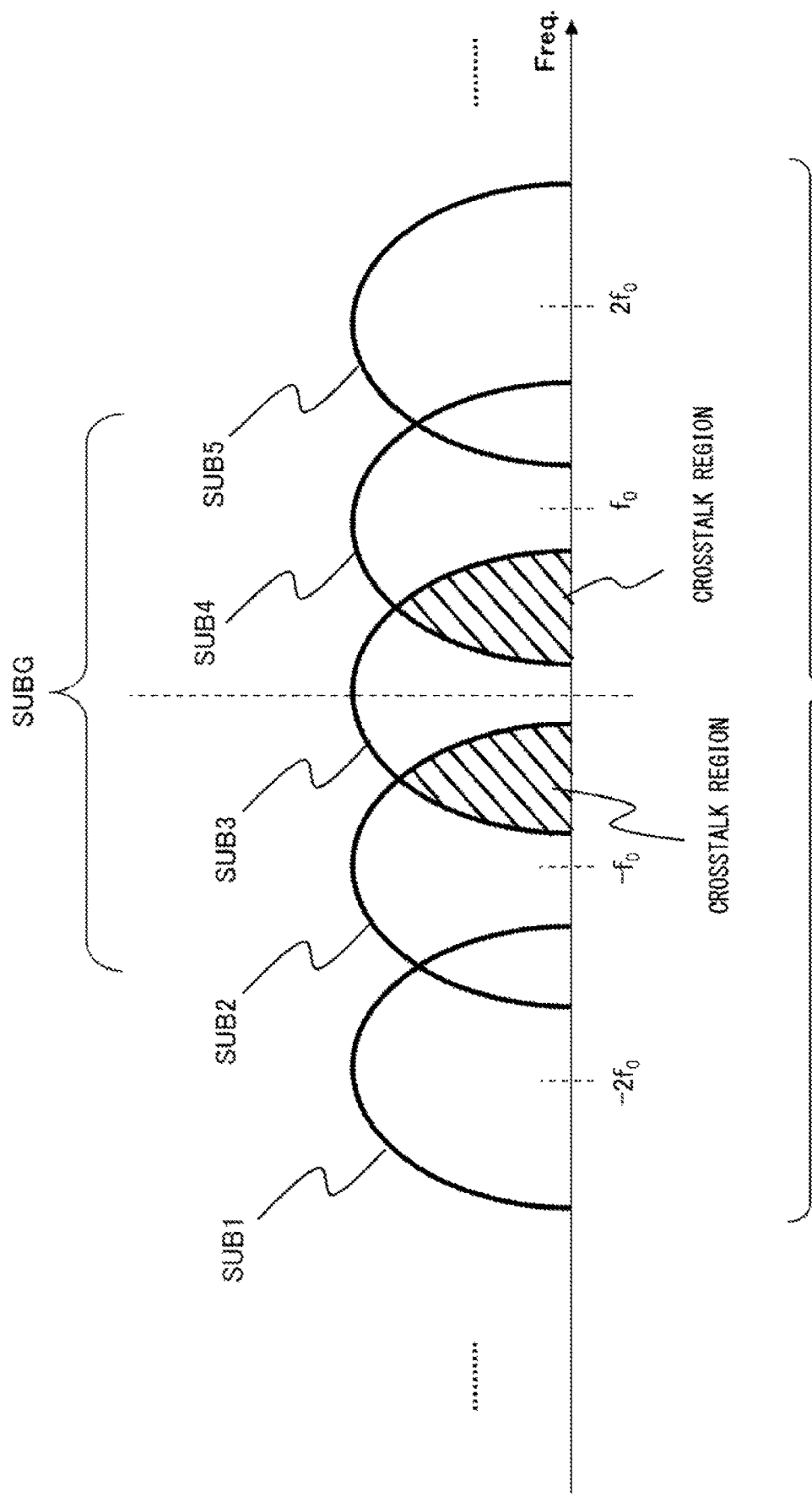
FIG. 2 is a diagram showing a configuration of a subcarrier-multiplexed signal.

As shown in FIG. 2, in this case, five subcarrier signals SUB1 to SUB5 are wavelength-division multiplexed to thereby generate one channel signal (Ch), and a subcarrier-multiplexed signal including a plurality of channel signals is transmitted and received. The subcarrier signals SUB1 to SUB5 are subcarrier signals in NRZ format and are wavelength-division multiplexed at a spacing of a frequency $f_0$. In the optical transmission apparatus 10, the subcarrier signals SUB1 to SUB5 are converted into optical signals by the respective optical transmitters 11-1 to 11-5, each of which is composed of a digital/analog converter, a light source, an optical modulator, and the like. Further, the optical signals transmitted from the optical transmitters 11-1 to 11-5 are wavelength-division multiplexed by the multiplexer 12 to thereby generate one channel signal.

This WDM channel signal is further wavelength-division multiplexed with another channel signal, then passes through the optical fiber transmission line 31 and the ROADM device 32, and is transmitted to the optical reception apparatus 90. In the optical reception apparatus 90, the received channel signal is separated into a plurality of subcarrier signals by the demultiplexer 21. The separated subcarrier signals pass through the optical receivers 22-1 to 22-5, each of which is composed of a coherent mixer, an optical/electrical converter, an analog/digital converter, and the like, and is transmitted to the hybrid MIMO equalizer 900

Crosstalk between a plurality of subcarriers remains in the subcarrier signal separated by the demultiplexer 21. For example, depending on a subcarrier signal between adjacent subcarriers, crosstalk between two or three subcarriers may remain. For this reason, these subcarrier signals cannot be demodulated. Therefore, by performing MIMO equalization processing, it is possible to cancel the crosstalk and demodulate the subcarrier signal. That is, as shown in FIG. 2, since the wide-band subcarrier signals SUB1 to SUB5 in NRZ format are wavelength-division multiplexed in this example, the spectrum of each subcarrier signal overlaps on a frequency axis, and crosstalk, which is the diagonally shaded area, occurs. The crosstalk of the subcarrier signals in this crosstalk region is suppressed by performing MIMO equalization of each subcarrier signal at the receiving end, so that the subcarrier signals can be separated.

Note that in the event of band narrowing that occurs when passing through the ROADM device 32 asymmetric spectrum narrowing due to source frequency offset and the like, the outermost part of the spectra of a plurality of overlapping subcarrier signals in NRZ format is steeply cut out, and information is thereby lost. In the case of receiving such signals affected by band narrowing and the like, the characteristics of each FIR filter required for the MIMO equalizer become steep in order to achieve both of suppression of crosstalk between subcarriers and accurate compensation for waveform distortion caused by band narrowing or the like, which are the intended purpose, in the MIMO equalizer at the receiving end, which causes a significant increase in the number of taps.

Thus, as described above as the problem of Non Patent Literature 1, the circuit size is increased. Further, even if the number of taps increases, the convergence performance of a blind equalization algorithm such as CMA is degraded, which results in the deterioration of signal quality.

Therefore, in the optical reception apparatus 90 according to the comparative example, MIMO equalization processing is performed by the hybrid MIMO equalizer 900 including an FDE (Frequency-Domain Equalizer)-MIMO equalizer (which is referred to hereinafter as an FDE-MIMO equalizer) 910, which is a frequency-domain MIMO equalizer, and a TDE (Time-Domain Equalizer)-MIMO equalizer (which is referred to hereinafter as a TDE-MIMO equalizer) 920, which is a time-domain MIMO equalizer.

The FDE has a filter structure that transforms a received signal sequence into a frequency domain once by FFT (Fast Fourier Transform) and multiplies the result by a filter shape function, and then transforms it back into a time domain by IFFT (Inverse Fast Fourier Transform). Its feature is that, although the overhead of an FFT/IFFT circuit occurs, the circuit implementation efficiency is higher compared with TDE that requires a convolution operation. For example, a filter that requires 30 taps or more can be implemented with a smaller circuit size by the FDE than the TDE. Therefore, the FDE enables efficient circuit implementation even with an equalizer that requires steep and accurate filter characteristics with a long impulse response length.

On the other hand, the number of frequency-domain filter coefficients of the FDE is equal to the size of FFT/IFFT, and it is an order of magnitude larger than the number of time-domain tap coefficients of the TDE. Thus, while the FDE is not suitable for an equalizer that compensates for waveform distortion with dynamic variations, it is a significantly effective way to accurately compensate for waveform distortion with static or very slow variations.

In contrast, the TDE is suitable for a relatively small equalizer of 30 taps or less since it achieves a small circuit size and is able to deal with dynamic variations. However, the TDE is not suitable for achieving accurate and steep filter characteristics due to the circuit size issue with an increase in the number of taps.

Figure 3:
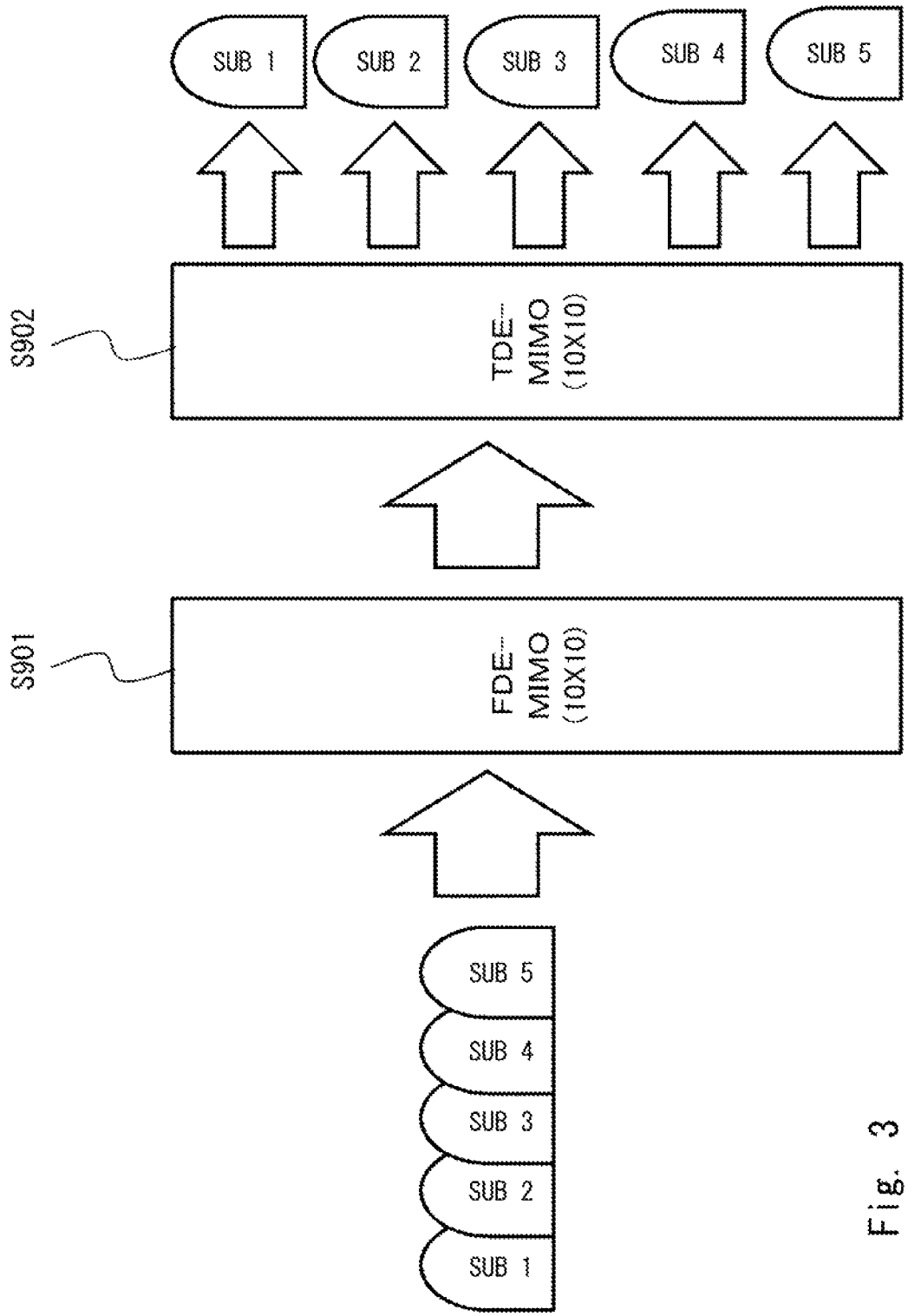
FIG. 3 is a diagram for explaining a MIMO equalization processing method according to the comparative example.

FIG. 3 shows an outline of the MIMO equalization processing according to the comparative example. As shown in FIG. 3, in the comparative example, first, FDE-MIMO equalization processing is performed on the received subcarrier signals SUB1 to SUB5 by the FDE-MIMO equalizer 910, and the subcarrier signals SUB1 to SUB5 that have been subjected to the FDE-MIMO equalization processing are thereby generated (S901). Next, TDE-MIMO equalization processing is performed on the subcarrier signals SUB1 to SUB5, that have been subjected to the FDE-MIMO equalization processing, by the TDE-MIMO equalizer 920, and the subcarrier signals SUB1 to SUB5 that have been subjected to the TDE-MIMO processing and that can be demodulated are thereby generated (S902). Thus, when each subcarrier signal is polarized and multiplexed with an X-polarized wave component and a Y-polarized wave component, the FDE-MIMO equalizer 910 becomes a 10×10 MIMO equalizer and the TDE-MIMO equalizer 920 becomes a 10×10 MIMO equalizer. Note that the N×N MIMO equalizer is a MIMO equalizer of which the input signal×the output signal is N×N, and is a MIMO equalizer of which the number of FIR filters (or filter coefficient multipliers) that constitute the equalizer is N×N.

The FDE-MIMO equalizer is characterized in that it can achieve a steep and accurate filter with a high circuit implementation efficiency, and the TDE-MIMO equalizer is characterized in that it allows dynamic and adaptive crosstalk compensation. In the comparative example, by using a hybrid MIMO equalizer obtained by combining these equalizers, it is possible to suppress the deterioration of the characteristics of a MIMO equalizer and compensating for crosstalk between subcarriers as well as minimizing an increase in circuit size in spite of the occurrence of signal spectrum narrowing caused by passing through the ROADM device 32 or asymmetric spectrum degradation due to optical frequency offset or the like.

On the other hand, as shown in FIG. 3, in the comparative example, when the channel signal is a five-subcarrier and a two-polarization-multiplexed signal, the MIMO equalizers are a 10×10 FDE-MIMO equalizer and a 10×10 TDE- MIMO equalizer. In this case, each equalizer is composed of 100 of FIR filters (or filter coefficient multipliers). Thus, when the number of subcarrier signals to be multiplexed and the number of times of polarization multiplexing of the subcarrier signal are increased, the number of FIR filters (or the filter coefficient multipliers) of the MIMO equalizer is increased in proportion to the former increase, which causes a problem that the circuit size is increased.

Therefore, in the following example embodiments, by using a hybrid MIMO equalizer like in the comparative example, it is possible to further reduce the circuit size while suppressing crosstalk between subcarriers.

(Outline of Example Embodiments)

Figure 4:
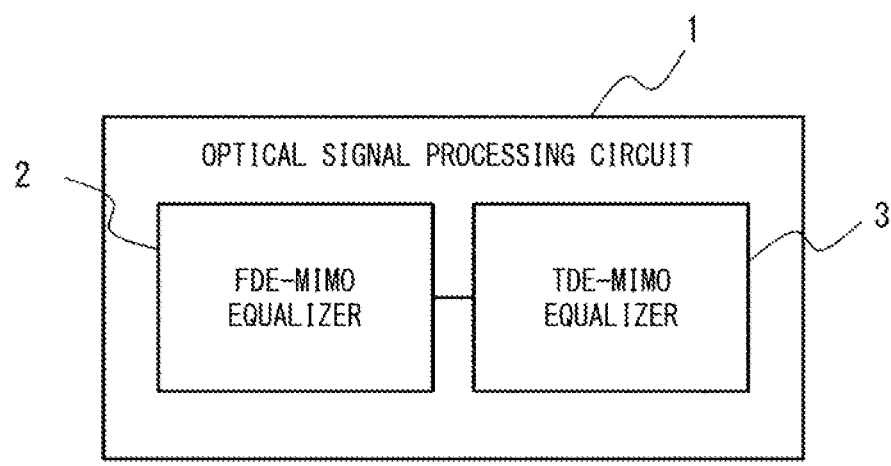
FIG. 4 is a configuration diagram showing an outline of an optical signal processing circuit according to example embodiments.
Figure 5:
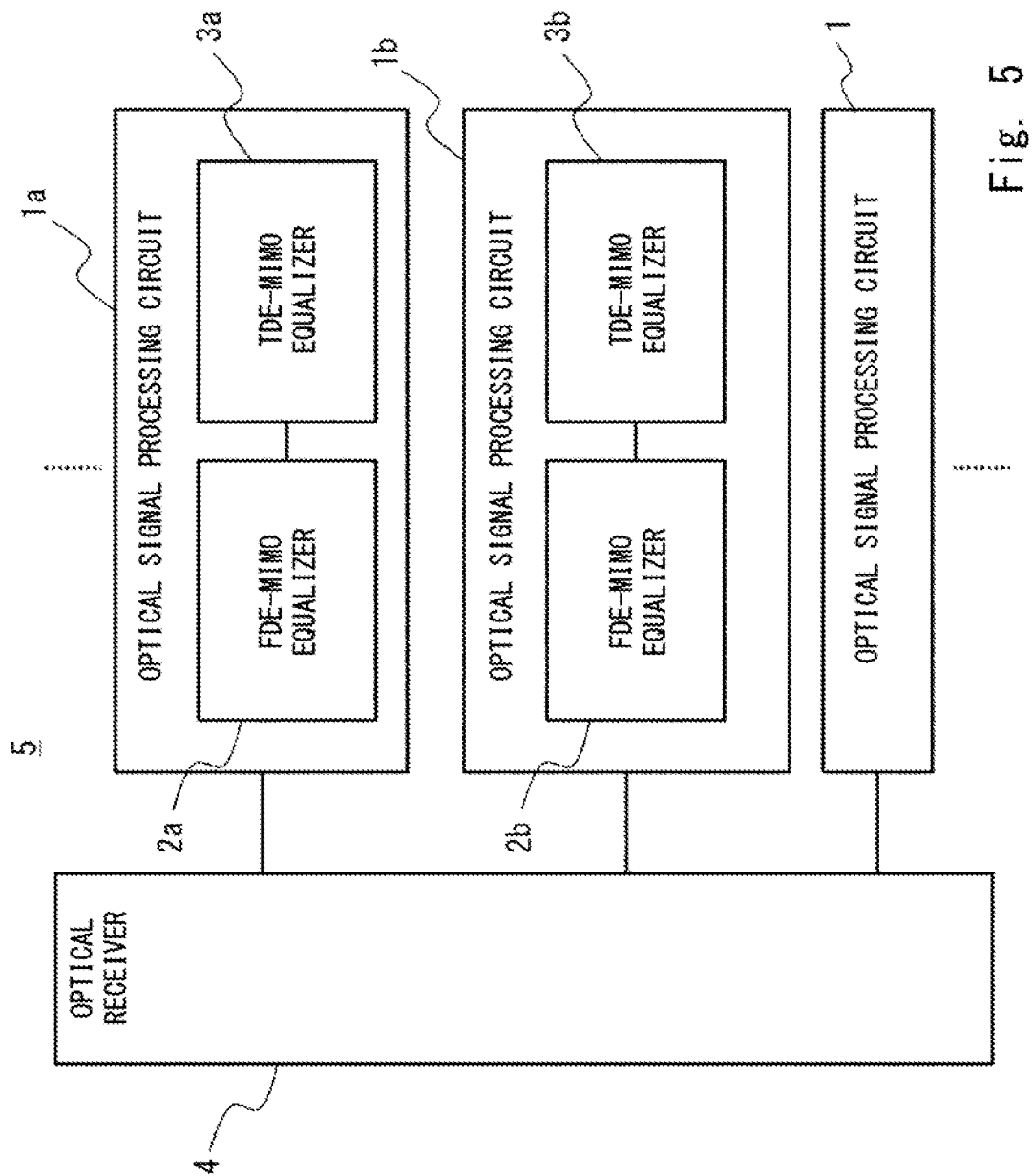
FIG. 5 is a schematic diagram showing an outline of an optical reception apparatus according to the example embodiments.

FIG. 4 shows an outline of an optical signal processing circuit 1 according to the example embodiments, and FIG. 5 shows an outline of an optical reception apparatus according to the example embodiments.

As shown in FIG. 4, the optical signal processing circuit 1 includes an FDE-MIMO equalizer (a frequency-domain MIMO equalizer) 2 and a TDE-MIMO equalizer (a time-domain MIMO equalizer) 3. The FDE-MIMO equalizer 2 generates, based on continuous subcarrier signals including a target subcarrier signal in a channel signal (an optical multicarrier signal) to be received, the continuous subcarrier signals that have been subjected to frequency-domain MIMO equalization processing. The TDE-MIMO equalizer 3 generate, based on the continuous subcarrier signals that have been subjected to the frequency-domain MIMO equalization processing, the target subcarrier signal that has been subjected to time-domain MIMO equalization processing.

For example, when the continuous subcarrier signals include N (N is a natural number) subcarrier signals that are continuous with the frequencies above and below the target subcarrier signal, the FDE-MIMO equalizer 2 is a (2N+1)× (2N+1) FDE-MIMO equalizer and the TDE-MIMO equalizer 3 is a (2N+1)×1 TDE-MIMO equalizer. Further, the number of inputs and the number of outputs of each equalizer are proportional to the number of times of polarization multiplexing. For example, when the channel signal is a three-subcarrier and a two-polarization-multiplexed signal, a 6×6 FDE-MIMO equalizer and a 6×2 TDE-MIMO equalizer are obtained.

Further, as shown in FIG. 5, an optical reception apparatus 5 includes an optical receiver 4 and a plurality of optical signal processing circuits 1. The optical receiver 4 receives a channel signal in which a plurality of subcarrier signals are multiplexed. Each of the plurality of optical signal processing circuits 1 performs FDE-MIMO equalization processing and TDE-MIMO equalization processing on continuous subcarrier signals including a target subcarrier signal selected for each of the optical signal processing circuits 1 in the received channel signal. For example, an optical signal processing circuit 1a (a first optical signal processing circuit) of the plurality of optical signal processing circuits 1 includes an FDE-MIMO equalizer 2a (a first FDE-MIMO equalizer) and a TDE-MIMO equalizer 3a (a first TDE-MIMO equalizer). The FDE-MIMO equalizer 2a generates, based on first continuous subcarrier signals including a first target subcarrier signal in a channel signal to be received, the first continuous subcarrier signals that have been subjected to the frequency-domain MIMO equalization processing, and the TDE-MIMO equalizer 3a generates, based on the first continuous subcarrier signals that have been subjected to the frequency-domain MIMO equalization processing, the first target subcarrier signal that has been subjected to the time-domain MIMO equalization processing Further, an optical signal processing circuit 1b (a second optical signal processing circuit) of the plurality of optical signal processing circuits 1 includes an FDE-MIMO equalizer 2b (a second FDE-MIMO equalizer) and a TDE-MIMO equalizer 3b (a second TDE-MIMO equalizer). The FDE-MIMO equalizer 2b generates, based on second continuous subcarrier signals including a second target subcarrier signal in a channel signal to be received, the second continuous subcarrier signals that have been subjected to the frequency-domain MIMO equalization processing, and the TDE-MIMO equalizer 3b generates, based on the second continuous subcarrier signals that have been subjected to the frequency-domain MIMO equalization processing, the second target subcarrier signal that has been subjected to the time-domain MIMO equalization processing As described above, in the example embodiments, by performing equalization processing on the continuous subcarrier signals including the target subcarrier signal as a processing unit by the FDE-MIMO equalizer and the TDE-MIMO equalizer, it is possible to, while suppressing crosstalk between subcarriers, reduce the circuit size more than it is reduced in the comparative example.

First Example Embodiment

Figure 6:
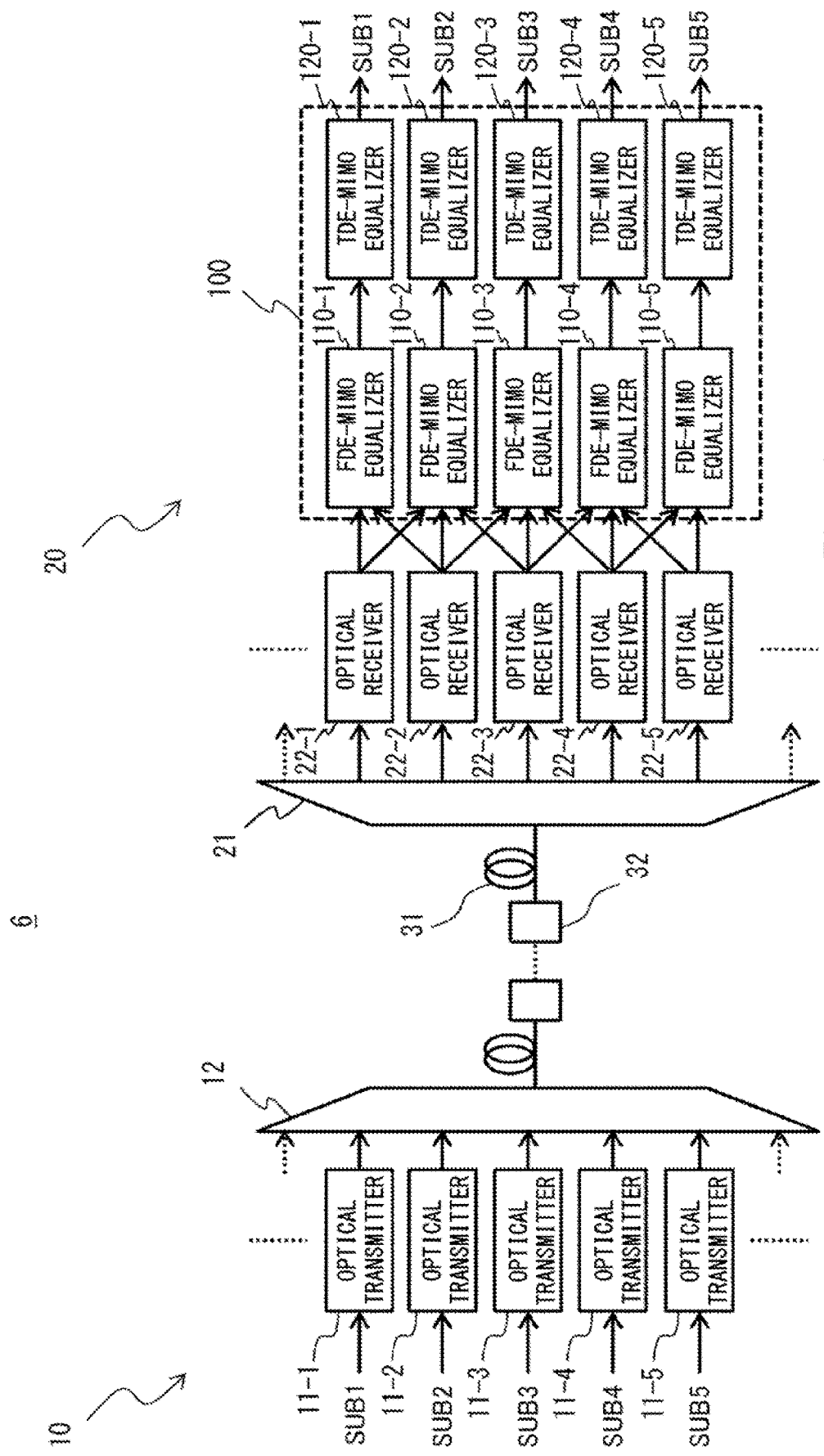
FIG. 6 is a configuration diagram showing a configuration of a WDM optical transmission system according to a first example embodiment.

A first example embodiment will be described hereinafter with reference to the drawings. FIG. 6 shows a configuration of a WDM optical transmission system according to this example embodiment. As shown in FIG. 6, like in the comparative example, a WDM optical transmission system 6 according to this example embodiment includes the optical transmission apparatus 10 and an optical reception apparatus 20 that perform optical communication via the optical fiber transmission line 31. Further, in this case, like in the case of the comparative example as described with reference to FIG. 2, five subcarrier signals are wavelength-division multiplexed to thereby generate one channel signal, and a subcarrier-multiplexed signal is transmitted and received.

This example embodiment differs from the comparative example of FIG. 1 described above mainly in the configuration of a hybrid MIMO equalizer on the receiving side, while configurations of this example embodiment other than the above one are similar to those in the above comparative example. As shown in FIG. 6, a hybrid MIMO equalizer 100 according to this example embodiment includes a plurality of FDE-MIMO equalizers 110 and a plurality of TDE-MIMO equalizers 120. In this example, the hybrid MIMO equalizer 100 includes FDE-MIMO equalizers 110-1 to 110-5 and TDE-MIMO equalizers 120-1 to 120-5. The optical receivers 22-1 to 22-5 input subcarrier signals required by the FDE-MIMO equalizers 110-1 to 110-5, respectively, to the FDE-MIMO equalizers 110 to 110-5. Note that instead of the five optical receivers 22-1 to 22-5, there may be one optical receiver or any number of optical receivers.

The basic functions of the FDE-MIMO equalizer 110 and the TDE-MIMO equalizer 120 are similar to those in the comparative example. That is, the FDE-MIMO equalizer 110 can accurately compensate for waveform distortion with static variations, and is capable of efficient circuit implementation of steep filter characteristics. The FDE-MIMO equalizer 110 allows accurate equalization of band narrowing, which does not substantially vary once a transmission path is determined, caused by passing through the ROADM device 32, asymmetric spectrum narrowing, which varies very slowly, due to temperature fluctuations or aging degradiation such as source frequency offset and the like, and thereby effectively cancels static crosstalk between subcarriers.

Crosstalk between subcarriers cannot be completely compensated for only by static equalization using the FDE-MIMO equalizer 110 with predetermined filter coefficients, and crosstalk variations and waveform distortion caused by polarization fluctuations, residual crosstalk and residual waveform distortion caused by different factors remain. Thus, the output of the FDE-MIMO equalizer 110 is then equalized by using the TDE-MIMO equalizer 120. The TDE-MIMO equalizer 120 compensates for residual waveform distortion with dynamic variations. In the TDE-MIMO equalizer 120, since the tap coefficients are updated in real time by using an algorithm such as CMA, varying crosstalk and waveform distortion are adaptively equalized, which allows adequate compensation of residual crosstalk and waveform distortion, which cannot be sufficiently suppressed only by the FDE-MIMO equalizer 110, and thereby appropriately demodulates the subcarrier signals.

In this example embodiment, by focusing on the fact that crosstalk is dominantly affected by adjacent subcarrier signals among the plurality of subcarrier signals, MIMO equalization processing is performed in parallel for respective subcarrier signal groups (continuous subcarrier signals) SUBG in which crosstalk can occur. The subcarrier signal group SUBG includes a target subcarrier signal and a subcarrier signal causing crosstalk to the target subcarrier signal. A subcarrier signal (a crosstalk induction signal) causing crosstalk is a signal that overlaps a target subcarrier signal in a frequency domain, and is, for example, an adjacent subcarrier signal adjacent to the target subcarrier signal in the frequency domain. The subcarrier signal causing crosstalk is not limited to an adjacent subcarrier signal, and may include a plurality of subcarrier signals.

For example, as shown in FIG. 2, when the subcarrier signal SUB3 among the subcarrier signals SUB1 to SUB5 is a target subcarrier signal, the subcarrier signal SUB3 and the adjacent subcarrier signals SUB2 and SUB4 in the frequency domain overlap each other, and therefore crosstalk occurs. On the other hand, since the subcarrier signals SUB1 and SUB5 that are further away from the subcarrier signal SUB3 than the adjacent subcarrier signals SUB2 and SUB4 do not overlap the subcarrier signal SUB3 in the frequency domain, crosstalk does not occur.

Therefore, for example, when the subcarrier signal SUB3 is a target subcarrier signal, the MIMO equalization processing is performed on the subcarrier signals SUB2 to SUB4 including the target subcarrier signal SUB3 and the adjacent subcarrier signals SUB2 and SUB4 as the subcarrier signal group SUBG in which crosstalk can occur. Further, when the subcarrier signal SUB1 is a target subcarrier signal, the MIMO equalization processing is performed on the subcarrier signals SUB1 and SUB2 including the target subcarrier signal SUB1 and the adjacent subcarrier signal SUB2 as the subcarrier signal group SUBG in which crosstalk can occur. Note that the number of subcarrier signals included in the channel signal is not limited to five and may instead be any number, and the number of subcarrier signals of the subcarrier signal group SUBG is not limited to three and may instead be any number.

Specifically, as shown in FIG. 6, the FDE-MIMO equalizers 110-1 to 110-5 and the TDE-MIMO equalizers 120-1 to 120-5 respectively perform MIMO processing by using the subcarrier signals SUB1 to SUB5 as target subcarrier signals and using three subcarrier signals (or two subcarrier signals) including the respective subcarrier signals as the subcarrier signal group SUBG. For example, the FDE-MIMO equalizer 110-1 and the TDE-MIMO equalizer 120-1 use the subcarrier signal SUB1 as the target subcarrier signal and the subcarrier signals SUB1 and SUB2 as the subcarrier signal group SUBG. The FDE-MIMO equalizer 110-2 and the TDE-MIMO equalizer 120-2 use the subcarrier signal SUB2 as the target subcarrier signal and the subcarrier signals SUB1 to SUB3 as the subcarrier signal group SUBG. The FDE-MIMO equalizers 110-3 to 110-5 and the TDE-MIMO equalizers 120-1 to 120-5 have configurations similar to those of the FDE-MIMO equalizers 110-1 and 110-2 and the TDE-MIMO equalizers 120-1 and 120-2 described above.

Figure 7:
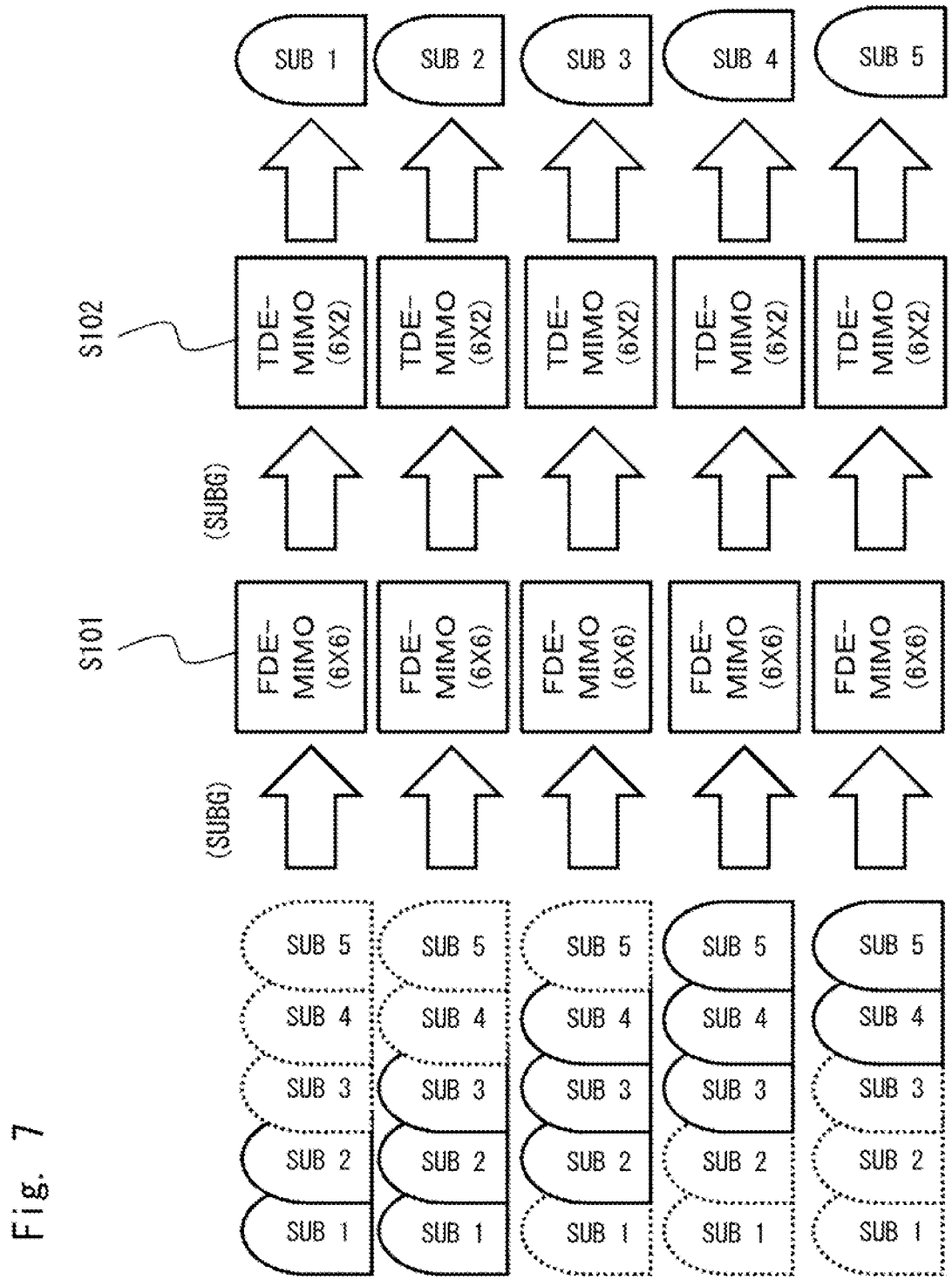
FIG. 7 is a diagram for explaining a MIMO equalization processing method according to the first example embodiment.

FIG. 7 shows an outline of MIMO equalization processing according to this example embodiment. As shown in FIG. 7, in this example embodiment, first, the subcarrier signal groups SUBG respectively selected for the received subcarrier signals SUB1 to SUB5 are subjected to FDE-MIMO equalization processing by the FDE-MIMO equalizers 110-1 to 110-5, and the subcarrier signal groups SUBG that have been subjected to the FDE-MIMO equalization processing are thereby generated (S101). Next, TDE-MIMO equalization processing is performed on the subcarrier signal groups SUBG, that have been subjected to the FDE-MIMO equalization processing, by the respective TDE-MIMO equalizers 120-1 to 120-5, and the subcarrier signals SUB1 to SUB5 that have been subjected to the TDE-MIMO processing and that can be demodulated are thereby generated (S102).

Specifically, the FDE-MIMO equalizer 110-1 inputs the subcarrier signals SUB1 and SUB2 and performs the FDE-MIMO equalization processing, and outputs the subcarrier signals SUB1 and SUB2 that have been subjected to the FDE-MIMO equalization processing. The TDE-MIMO equalizer 120-1 inputs the subcarrier signals SUB1 and SUB2 that have been subjected to the FDE-MIMO equalization processing and performs the TDE-MIMO equalization processing, and outputs the subcarrier signal SUB1 that has been subjected to the TDE-MIMO processing.

The FDE-MIMO equalizer 110-2 inputs the subcarrier signals SUB1 to SUB3 and performs the FDE-MIMO equalization processing, and outputs the subcarrier signals SUB1 to SUB3 that have been subjected to the FDE-MIMO equalization processing. The TDE-MIMO equalizer 120-2 inputs the subcarrier signals SUB1 to SUB3 that have been subjected to the FDE-MIMO equalization processing and performs the TDE-MIMO equalization processing, and outputs the subcarrier signal SUB2 that has been subjected to the TDE-MIMO processing. The FDE-MIMO equalizers 110-3 to 110-5 and the TDE-MIMO equalizers 120-1 to 120-5 have configurations similar to those of the FDE-MIMO equalizers 110-1 and 110-2 and the TDE-MIMO equalizers 120-1 and 120-2 described above. Thus, when each subcarrier signal is polarized and multiplexed with an X-polarized wave component and a Y-polarized wave component, the FDE-MIMO equalizer 110 becomes a 6×6 MIMO equalizer and the TDE-MIMO equalizer 120 becomes a 6×2 MIMO equalizer. Note that the number of times of polarization multiplexing of the subcarrier signal is not limited to two, and may instead be any number.

In order to facilitate the further understanding of this example embodiment, specific configuration examples of the FDE-MIMO equalizer and the TDE-MIMO equalizer according to the comparative example and this example embodiment will be described below.

<FDE-MIMO Equalizer according to Comparative Example>

Figure 8:
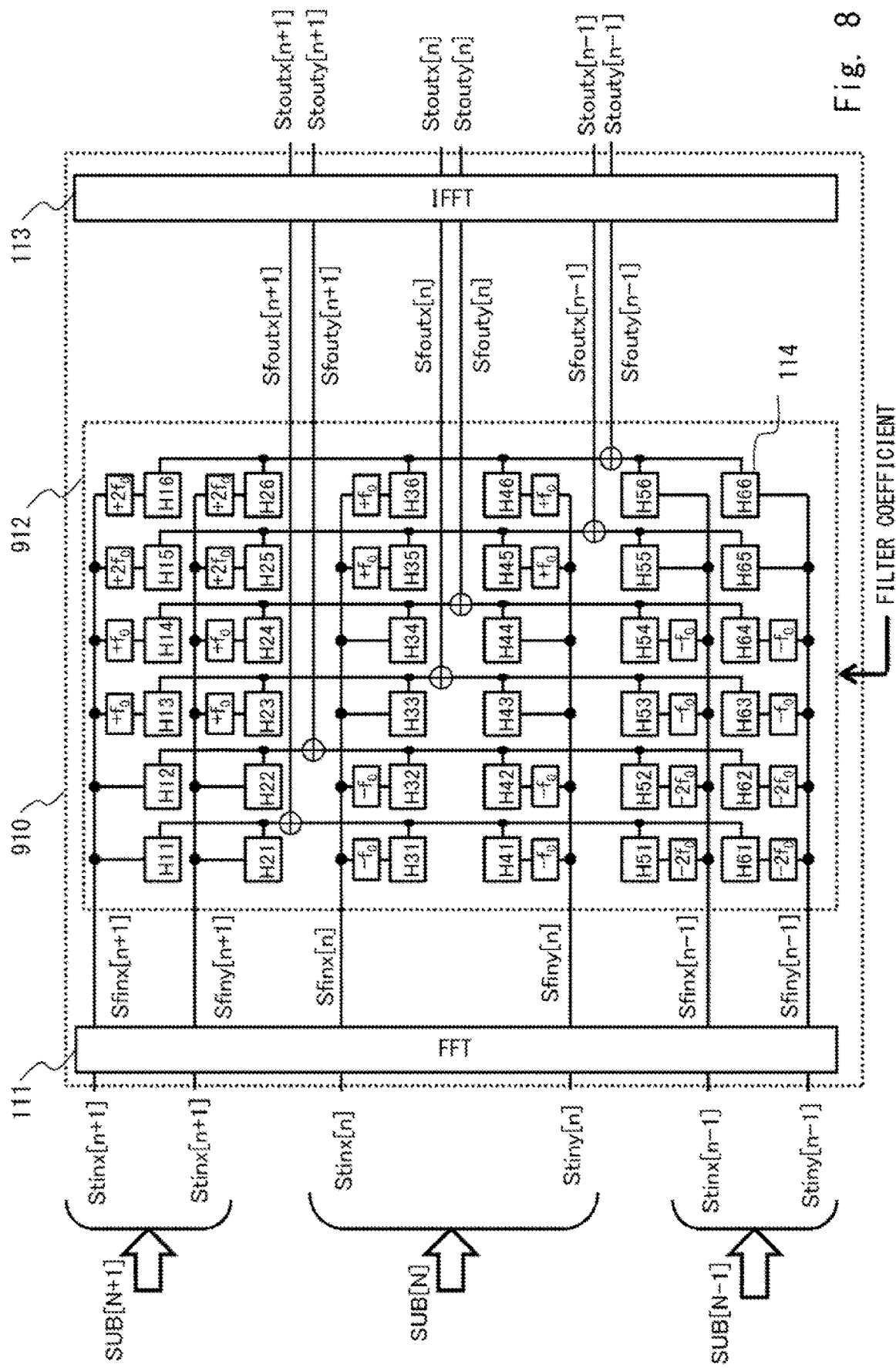
FIG. 8 is a configuration diagram showing a configuration of an FDE-MIMO equalizer according to the comparative example.

FIG. 8 shows a specific configuration of the FDE-MIMO equalizer according to the comparative example. As shown in FIG. 8, the FDE-MIMO equalizer 910 includes an FFT circuit 111, an FDE-MIMO core circuit 912, an IFFT circuit 113, and filter coefficient multipliers 114. Note that, in order to compare the comparative example with this example embodiment, the FDE-MIMO equalizer 910 inputs a received subcarrier signal SUB[N] and adjacent subcarrier signals SUB[N+1] and SUB[N−1], and outputs the subcarrier signal SUB[N] and the adjacent subcarrier signals SUB[N+1] and SUB[N−1] that have been subjected to FDE-MIMO equalization processing. Further, each subcarrier signal includes an X-polarized wave component and a Y-polarized wave component.

The FFT circuit 111 converts respective subcarrier signals to be input (Stinx[n+1], Stiny[n+1], Stinx[n], Stiny[n], Stinx[n−1], and Stiny[n−1]) in the time domain into subcarrier signals (Sfinx[n+1], Sfiny[n+1], Sfinx[n], Sfiny[n], Sfinx[n−1], and Sfiny[n−1]) in the frequency domain, and outputs the converted subcarrier signals in the frequency domain to the FDE-MIMO core circuit 912.

The FDE-MIMO core circuit 912 performs the FDE-MIMO equalization processing on each subcarrier signal in the frequency domain, and outputs, to the IFFT circuit 113, subcarrier signals (Sfoutx[n+1], Sfouty[n+1], Sfoutx[n], Sfouty[n], Sfoutx[n−1], and Sfouty[n−1]) in the frequency domain that have been subjected to the FDE-MIMO equalization processing in which crosstalk and band narrowing have been compensated.

The FDE-MIMO core circuit 912 compensates for waveform distortion caused by crosstalk or band narrowing by using a 6×6 filter structure. While the TDE is composed of FIR filters that implement a convolution operation, the FDE can be implemented by the filter coefficient multipliers 114 that only perform simple multiplication of filter characteristics (filter coefficients H11 to H66). That is, the FDE-MIMO equalizer 910 is a 6×6 FDE-MIMO equalizer composed of 6×6 filter coefficient multipliers 114. In other words, the FDE-MIMO equalizer 910 includes 36 of the filter coefficient multipliers 114 respectively having the filter coefficients H11 to H66. The FDE-MIMO core circuit 912 with steep and accurate filter characteristics is thereby efficiently implemented.

For example, in the FDE-MIMO core circuit 912, the filter coefficient multipliers 114 are arranged in a matrix of six rows×six columns. The filter coefficient multipliers 114 respectively having the filter coefficients H11 to H16 for inputting Sfinx[n+1] are arranged in a first row (an input row of Sfinx[n+1]), and the filter coefficient multipliers 114 respectively having the filter coefficients H21 to H26 for inputting Sfiny[n+1] are arranged in a second row (an input row of Sfiny[n+1]). That is, the filter coefficient multipliers 114 respectively having the filter coefficients H11 to H16 and H21 to H26 are circuits for inputting the subcarrier signal SUB[N+1]. Similarly, the filter coefficient multipliers 114 respectively having the filter coefficients H31 to H36 and H41 to H46 are circuits for inputting the subcarrier signal SUB[N]. The filter coefficient multipliers 114 respectively having the filter coefficients H51 to H56 and H61 to H66 are circuits for inputting the subcarrier signal SUB[N−1].

Further, the filter coefficient multipliers 114 respectively having the filter coefficients H11, H21, H31, H41, H51, and H61 for outputting Sfoutx[n+1] are arranged in a first column (an output column of Sfoutx[n+1]), and the filter coefficient multipliers 114 respectively having the filter coefficients H12, H22, H32, H42, H52, and H62 for outputting Sfouty[n+1] are arranged in a second column (an output column of Sfouty[n+1]). That is, the filter coefficient multipliers 114 respectively having the filter coefficients H11, H12, H21, H22, H31, H32, H41, H42, H51, H52, H61, and H62 are circuits for outputting the subcarrier signal SUB[N+1]. In other words, the filter coefficient multipliers 114 respectively having the filter coefficients H11, H12, H21, H22, H31, H32, H41, H42, H51, H52, H61, and H62 are circuits for inputting the subcarrier signals SUB[N+1], SUB[N], and SUB[N−1] and outputting the subcarrier signal SUB[N+1].

Similarly, the filter coefficient multipliers 114 respectively having the filter coefficients H13, H14, H23, H24, H33, H34, H43, H44, H53, H54, H63, and H64 are circuits for inputting the subcarrier signals SUB[N+1], SUB[N], and SUB[N−1] and outputting the subcarrier signal SUB[N]. The filter coefficient multipliers 114 respectively having the filter coefficients H15, H16, H25, H26, H35, H36, H45, H46, H55, H56, H65, and H66 are circuits for inputting the subcarrier signals SUB[N+1], SUB[N], and SUB[N−1] and outputting the subcarrier signal SUB[N−1].

By the above circuit configuration, in the comparative example, when the subcarrier signal SUB[N+1] is processed, the subcarrier signal SUB[N+1] that has been subjected to the FDE-MIMO processing is generated by using the subcarrier signals SUB[N] and SUB[N−1]. For example, when Sfoutx[n+1] is generated, Sfinx[n+1] multiplied by the filter coefficient H11, Sfiny[n+1] multiplied by the filter coefficient H21, Sfinx[n] multiplied by the filter coefficient H31 of a frequency $-f_0$ (an adjacent subcarrier on the negative side), Sfiny[n] multiplied by the filter coefficient H41 of the frequency $-f_0$, Sfinx[n−1] multiplied by the filter coefficient H51 of a frequency $-2f_0$ (a subcarrier adjacent to the adjacent subcarrier on the negative side), and Sfiny[n−1] multiplied by the filter coefficient H61 of the frequency $-2f_0$ are added to each other.

Similarly, when the subcarrier signal SUB[N] is processed, the subcarrier signal SUB[N] that has been subjected to the FDE-MIMO processing is generated by using the subcarrier signals SUB[N+1] and SUB[N−1]. For example, when Sfoutx[n] is generated, Sfinx[n+1] multiplied by the filter coefficient H13 of a frequency $+f_0$ (an adjacent subcarrier on the positive side), Sfiny[n+1] multiplied by the filter coefficient H23 of the frequency $+f_0$, Sfinx[n] multiplied by the filter coefficient H33, Sfiny[n] multiplied by the filter coefficient H43, Sfinx[n−1] multiplied by the filter coefficient H53 of the frequency $-f_0$ (the adjacent subcarrier on the negative side), and Sfiny[n−1] multiplied by the filter coefficient H63 of the frequency $-f_0$ are added to each other.

Further, when the subcarrier signal SUB[N−1] is processed, the subcarrier signal SUB[N−1] that has been subjected to the FDE-MIMO processing is generated by using the subcarrier signals SUB[N+1] and SUB[N]. For example, when Sfoutx[n−1] is generated, Sfinx[n+1] multiplied by the filter coefficient H15 of a frequency $+2f_0$ (a subcarrier adjacent to the adjacent subcarrier on the positive side), Sfiny[n+1] multiplied by the filter coefficient H25 of the frequency $+2f_0$, Sfinx[n] multiplied by the filter coefficient H35 of the frequency $+f_0$ (the adjacent subcarrier on the positive side), Sfiny[n] multiplied by the filter coefficient H45 of the frequency $+f_0$, Sfinx[n−1] multiplied by the filter coefficient H55, and Sfiny[n−1] multiplied by the filter coefficient H65 are added to each other.

The IFFT circuit 113 again converts the subcarrier signals that have been subjected to the FDE-MIMO equalization processing by the FDE-MIMO core circuit 912 into respective subcarrier signals (Stoutx[n+1], Stouty[n+1], Stoutx[n], Stouty[n], Stoutx[n−1], Stouty[n−1]) in the time domain, and outputs the converted subcarrier signals in the time domain to the TDE-MIMO equalizer 920 connected behind (the back side of) the IFFT circuit 113.

<FDE-MIMO Equalizer According to First Example Embodiment>

Figure 9:
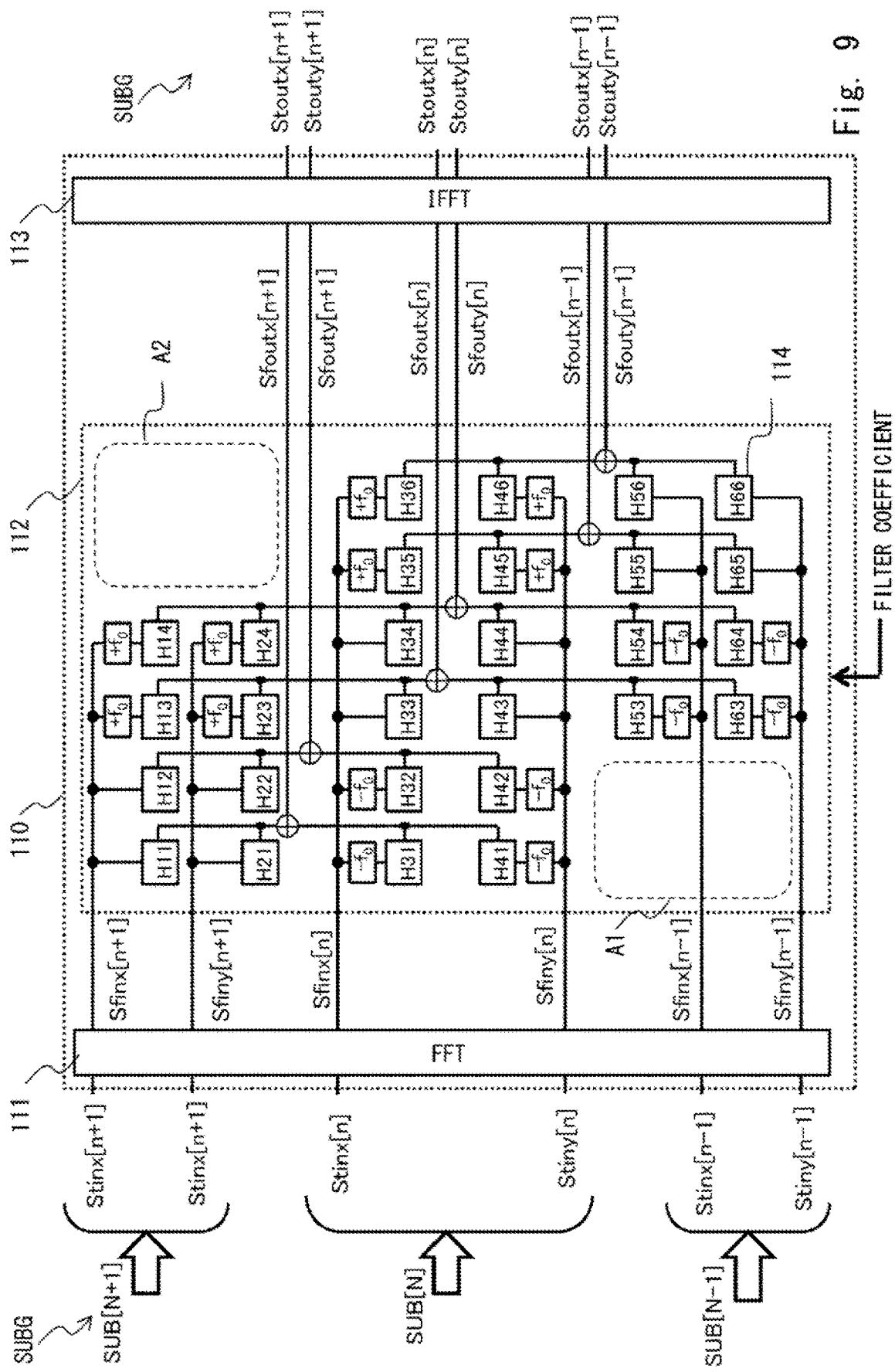
FIG. 9 is a configuration diagram showing a configuration of an FDE-MIMO equalizer according to the first example embodiment.

FIG. 9 shows a specific configuration of the FDE-MIMO equalizer according to this example embodiment. As shown in FIG. 9, like in the comparative example, the FDE-MIMO equalizer 110 includes the FFT circuit 111, an FDE-MIMO core circuit 112, the IFFT circuit 113, and the filter coefficient multipliers 114. In this example, it is assumed that the subcarrier signal SUB[N] is the target subcarrier signal, and the subcarrier signals SUB[N−1], SUB[N], and SUB[N+1] are the subcarrier signals SUBG. The FDE-MIMO equalizer 110 inputs the received subcarrier signal SUB[N] and adjacent subcarrier signals SUB[N+1] and SUB[N−1], and outputs the subcarrier signal SUB[N] and the adjacent subcarrier signals SUB[N+1] and SUB[N−1] that have been subjected to FDE-MIMO equalization processing. Further, each subcarrier signal includes an X-polarized wave component and a Y-polarized wave component.

The configuration of the FDE-MIMO core circuit differs from that of the comparative example. That is, although the FDE-MIMO core circuit 112 has a 6×6 filter structure similar to that of the comparative example and the FDE-MIMO equalizer 110 is a 6×6 FDE-MIMO equalizer, some of the filter coefficient multipliers 114 that constitute the FDE-MIMO equalizer in the comparative example have been deleted in this example embodiment.

As described above, crosstalk is dominantly affected by the adjacent subcarriers. Therefore, in the calculation in the MIMO equalization processing, only an adjacent subcarrier signal that significantly affects crosstalk is used while a subcarrier signal adjacent to the former adjacent subcarrier signal that hardly affects crosstalk is not used. Thus, in this example embodiment, the filter coefficient multiplier 114 that is not used for the calculation is deleted. By doing the above, the number of the filter coefficient multipliers 114 in this example can be eight less than the number of filter coefficient multipliers in the comparative example.

Specifically, the FDE-MIMO core circuit 112 includes only 28 of the filter coefficient multipliers 114 respectively having the filter coefficients H11 to H14, H21 to H24, H31 to H36, H41 to H46, H53 to H56, and H63 to H66.

The filter coefficient multipliers 114 respectively having the filter coefficients H11 to H14 and H21 to H24 serve as circuits for inputting the subcarrier signal SUB[N+1]. Like in the comparative example, the filter coefficient multipliers 114 respectively having the filter coefficients H31 to H36 and H41 to H46 serve as circuits for inputting the subcarrier signal SUB[N]. The filter coefficient multipliers 114 respectively having the filter coefficients H53 to H56 and H63 to H66 serve as circuits for inputting the subcarrier signal SUB[N−1].

Further, the filter coefficient multipliers 114 respectively having the filter coefficients H11, H12, H21, H22, H31, H32, H41, H42 serve as circuits (first FDE-MIMO equalization circuits) for inputting the subcarrier signal SUB[N+1] (a first subcarrier signal) and the subcarrier signal SUB[N] (a second subcarrier signal) and outputting the subcarrier signal SUB[N+1]. Like in the comparative example, the filter coefficient multipliers 114 respectively having the filter coefficients H13, H14, H23, H24, H33, H34, H43, H44, H53, H54, H63, and H64 serve as circuits (second FDE-MIMO equalization circuits) for inputting the subcarrier signal SUB[N+1] (the first subcarrier signal), the subcarrier signal SUB[N] (the second subcarrier signal), and the subcarrier signal SUB[N−1] (a third subcarrier signal) and outputting the subcarrier signal SUB[N]. The filter coefficient multipliers 114 respectively having the filter coefficients H35, H36, H45, H46, H55, H56, H65, and H66 serve as circuits (the second FDE-MIMO equalization circuits) for inputting the subcarrier signal SUB[N] (the second subcarrier signal) and the subcarrier signal SUB[N−1] (the third subcarrier signal) and outputting the subcarrier signal SUB[N−1].

That is, like in the comparative example, the adjacent subcarrier signals SUB[N+1] and SUB[N−1] are used in the MIMO equalization processing of the subcarrier signal SUB[N]. Therefore, the filter coefficient multipliers 114 (the filter coefficients H13, H14, H23, H24, H33, H34, H43, H44, H53, H54, H63, and H64) used for the calculation of the subcarrier signal SUB[N] are not deleted. In other words, like in the comparative example, the subcarrier signals SUB[N+1] and SUB[N−1] are added to the subcarrier signal SUB[N], whereby the subcarrier signal SUB[N] that has been subjected to the FDE-MIMO processing is generated. By doing the above, the MIMO equalization processing can be performed using the subcarrier signals SUB[N+1] and SUB[N−1] that are vertically adjacent to the subcarrier signal SUB[N] in the frequency domain.

On the other hand, in the MIMO equalization processing of the subcarrier signal SUB[N+1], unlike in the comparative example, only the adjacent subcarrier signal SUB[N] is used while the subcarrier signal SUB[N−1] is not used. Therefore, the filter coefficient multipliers 114 (the filter coefficients H11, H12, H21, H22, H31, H32, H41, and H42) used for the calculation of the subcarrier signal SUB[N+1] are left undeleted, and the filter coefficient multipliers 114 (the filter coefficients H51, H52, H61, and H62) that are not used for the calculation of the subcarrier signal SUB[N+1] shown in an area A1 are deleted. That is, in this example embodiment, the subcarrier signal SUB[N] is added to the subcarrier signal SUB[N+1], whereby the subcarrier signal SUB[N+1] that has been subjected to the FDE-MIMO processing is generated. By doing the above, the MIMO equalization processing can be performed using only the subcarrier signal SUB[N] adjacent to the subcarrier signal SUB[N+1] on the lower side in the frequency domain.

Similarly, in the MIMO equalization processing of the subcarrier signal SUB[N−1], unlike in the comparative example, only the adjacent subcarrier signal SUB[N] is used while the subcarrier signal SUB[N+1] is not used. Therefore, the filter coefficient multipliers 114 (the filter coefficients H35, H36, H45, H46, H55, H56, H65, and H66) used for the calculation of the subcarrier signal SUB[N−1] are left undeleted, and the filter coefficient multipliers 114 (the filter coefficients H15, H16, H25, and H26) that are not used for the calculation of the subcarrier signal SUB[N−1] shown in an area A2 are deleted. That is, in this example embodiment, the subcarrier signal SUB[N] is added to the subcarrier signal SUB[N−1], whereby the subcarrier signal SUB[N−1] that has been subjected to the FDE-MIMO processing is generated. By doing the above, the MIMO equalization processing can be performed using only the subcarrier signal SUB[N] adjacent to the subcarrier signal SUB[N−1] on the upper side in the frequency domain.

Note that although the filter coefficients of the filter coefficient multipliers 114 are different depending on a transmission path and system characteristics, since they are static, training may be performed at the time of system startup, or the characteristics may be evaluated for each transmission path and system, and the optimum filter coefficients may be calculated in advance.

For quasi-static band narrowing with slow variations or the like, it is not necessary to update the coefficients in real time, and actual filter coefficients may be updated after extracting some received data sequences and computing optical coefficients by software processing or the like. Such a technique is effective for variations in the amount of crosstalk and variations in band narrowing due to source frequency offset caused by temperature fluctuations or the like. Alternatively, filter coefficients may be determined by embedding a known pilot tone or training pattern into signals, including static and quasi-static variations.

<TDE-MIMO Equalizer according to Comparative Example>

Figure 10:
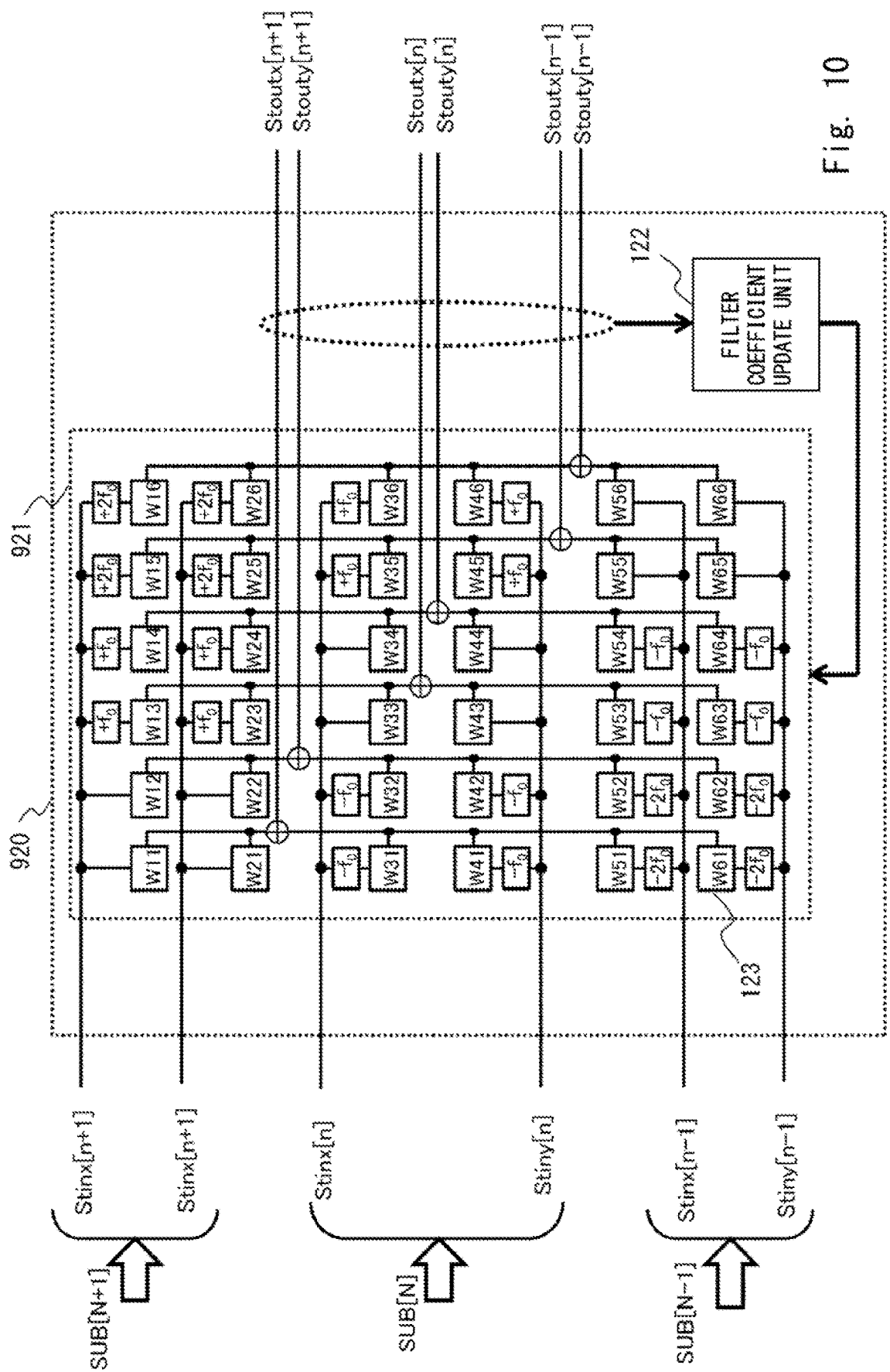
FIG. 10 is a configuration diagram showing a configuration of a TDE-MIMO equalizer according to the comparative example.

FIG. 10 shows a specific configuration of the TDE-MIMO equalizer according to the comparative example. As shown in FIG. 10, the TDE-MIMO equalizer 920 includes a TDE-MIMO core equalizer 921, a filter coefficient update unit 122, and FIR filters 123. Note that, in order to compare the comparative example with this example embodiment, the TDE-MIMO equalizer 920 inputs the subcarrier signal SUB[N] and the adjacent subcarrier signals SUB[N+1] and SUB[N−1] on which the FDE-MIMO equalizer 910 has performed FDE-MIMO equalization processing, and outputs the subcarrier signal SUB[N] and the adjacent subcarrier signals SUB[N+1] and SUB[N−1] that have been subjected to TDE-MIMO equalization processing. Further, each subcarrier signal includes an X-polarized wave component and a Y-polarized wave component.

The TDE-MIMO core equalizer 921 performs the TDE-MIMO equalization processing on each of the subcarrier signals to be input (Stinx[n+1], Stiny[n+1], Stinx[n], Stiny[n], Stinx[n−1], and Stiny[n−1]) in the time domain, and outputs the subcarrier signals (Sfoutx[n+1], Sfouty[n+1], Sfoutx[n], Sfouty[n], Sfoutx[n−1], and Sfouty[n−1]) in the time domain that have been subjected to the TDE-MIMO equalization processing.

The TDE-MIMO core equalizer 921 includes the 6×6 time-domain FIR filters 123 in order to adequately separate six time-domain signals. That is, the TDE-MIMO equalizer 920 is a 6×6 TDE-MIMO equalizer that is composed of 6×6 FIR filters 123. In other words, the TDE-MIMO core equalizer 921 includes 36 of the FIR filters 123 respectively having tap coefficients of W11 to W66.

The TDE-MIMO equalizer 920 calculates the weighted sums of components between subcarriers and outputs them. The tap coefficients (W11 to W66) of the FIR filters 123 are about 10 to 20 taps in terms of circuit size and dynamic coefficient update.

For example, in the TDE-MIMO core equalizer 921, the FIR filters 123 are arranged in a matrix of six rows×six columns. The FIR filters 123 respectively having the tap coefficients W11 to W16 for inputting Stinx[n+1] are arranged in a first row (an input row of Stinx[n+1]), and the FIR filters 123 respectively having the tap coefficients W21 to W26 for inputting Stiny[n+1] are arranged in a second row (an input row of Stiny[n+1]). That is, the FIR filters 123 respectively having the tap coefficients W11 to W16 and W21 to W26 are circuits for inputting the subcarrier signal SUB[N+1].

Similarly, the FIR filters 123 respectively having the tap coefficients W31 to W36 and W41 to W46 are circuits for inputting the subcarrier signal SUB[N]. The FIR filters 123 respectively having the tap coefficients W51 to W56 and W61 to W66 are circuits for inputting the subcarrier signal SUB[N−1].

Further, the FIR filters 123 respectively having the tap coefficients W11, W21, W31, W41, W51, and W61 for outputting Stoutx[n+1] are arranged in a first column (an output column of Stoutx[n+1]), and the FIR filters 123 respectively having the tap coefficients W12, W22, W32, W42, W52, and W62 for outputting Stouty[n+1] are arranged in a second column (an output column of Stouty[n+1]). That is, the FIR filters 123 respectively having the tap coefficients W11, W12, W21, W22, W31, W32, W41, W42, W51, W52, W61, and W62 are circuits for outputting the subcarrier signal SUB[N+1]. In other words, the FIR filters 123 respectively having the tap coefficients W11, W12, W21, W22, W31, W32, W41, W42, W51, W52, W61, and W62 are circuits for inputting the subcarrier signals SUB[N+1], SUB[N], and SUB[N−1] and outputting the subcarrier signal SUB[N+1]. Similarly, the FIR filters 123 respectively having the tap coefficients W13, W14, W23, W24, W33, W34, W43, W44, W53, W54, W63, and W64 are circuits for inputting the subcarrier signals SUB[N+1], SUB[N], and SUB[N−1] and outputting the subcarrier signal SUB[N]. The FIR filters 123 respectively having the tap coefficients W15, W16, W25, W26, W35, W36, W45, W46, W55, W56, W65, and W66 are circuits for inputting the subcarrier signals SUB[N+1], SUB[N], and SUB[N−1] and outputting the subcarrier signal SUB[N−1].

By the above circuit configuration, in the comparative example, when the subcarrier signal SUB[N+1] is processed, the subcarrier signal SUB[N+1] that has been subjected to the TDE-MIMO processing is generated by using the subcarrier signals SUB[N] and SUB[N−1]. For example, when Stoutx[n+1] is generated, Stinx[n+1] that has been subjected to FIR filter processing by the tap coefficient W11, Stiny[n+1] that has been subjected to the FIR filter processing by the tap coefficient W21, Stinx[n] that has been subjected to the FIR filter processing by the tap coefficient W31 of the frequency $-f_0$ (an adjacent subcarrier on the negative side), Stiny[n] that has been subjected to the FIR filter processing by the tap coefficient W41 of the frequency $-f_0$, Stinx[n−1] that has been subjected to the FIR filter processing by the tap coefficient W51 of the frequency $-2f_0$ (a subcarrier adjacent to the adjacent subcarrier on the negative side), and Stiny[n−1] that has been subjected to the FIR filter processing by the tap coefficient W61 of the frequency $-2f_0$ are added to each other.

Similarly, when the subcarrier signal SUB[N] is processed, the subcarrier signal SUB[N] that has been subjected to the TDE-MIMO processing is generated by using the subcarrier signals SUB[N+1] and SUB[N−1]. For example, when Stoutx[n] is generated, Stinx[n+1] that has been subjected to the FIR filter processing by the tap coefficient W13 of the frequency $+f_0$ (an adjacent subcarrier on the positive side), Stiny[n+1] that has been subjected to the FIR filter processing by the tap coefficient W23 of the frequency $+f_0$, Stinx[n] that has been subjected to the FIR filter processing by the tap coefficient W33, Stiny[n] that has been subjected to the FIR filter processing by the tap coefficient W43, Stinx[n−1] that has been subjected to the FIR filter processing by the tap coefficient W53 of the frequency $-f_0$ (the adjacent subcarrier on the negative side), and Stiny[n−1] that has been subjected to the FIR filter processing by the tap coefficient W63 of the frequency $-f_0$ are added to each other.

Further, when the subcarrier signal SUB[N−1] is processed, the subcarrier signal SUB[N−1] that has been subjected to the TDE-MIMO processing is generated by using the subcarrier signals SUB[N+1] and SUB[N]. For example, when Stoutx[n−1] is generated, Stinx[n+1] that has been subjected to the FIR filter processing by the tap coefficient W15 of the frequency +2$f_0$ (a subcarrier adjacent to the adjacent subcarrier on the positive side), and Stiny[n+1] that has been subjected to the FIR filter processing by the tap coefficient W25 of the frequency +2$f_0$, Stinx[n] that has been subjected to the FIR filter processing by the tap coefficient W35 of the frequency +$f_0$ (the adjacent subcarrier on the positive side), Stiny[n] that has been subjected to the FIR filter processing by the tap coefficient W45 of the frequency +$f_0$, Stinx[n−1] that has been subjected to the FIR filter processing by the tap coefficient W55, and Stiny[n−1] that has been subjected to the FIR filter processing by the tap coefficient W65 are added to each other.

<TDE-MIMO Equalizer according to First Example Embodiment>

Figure 11:
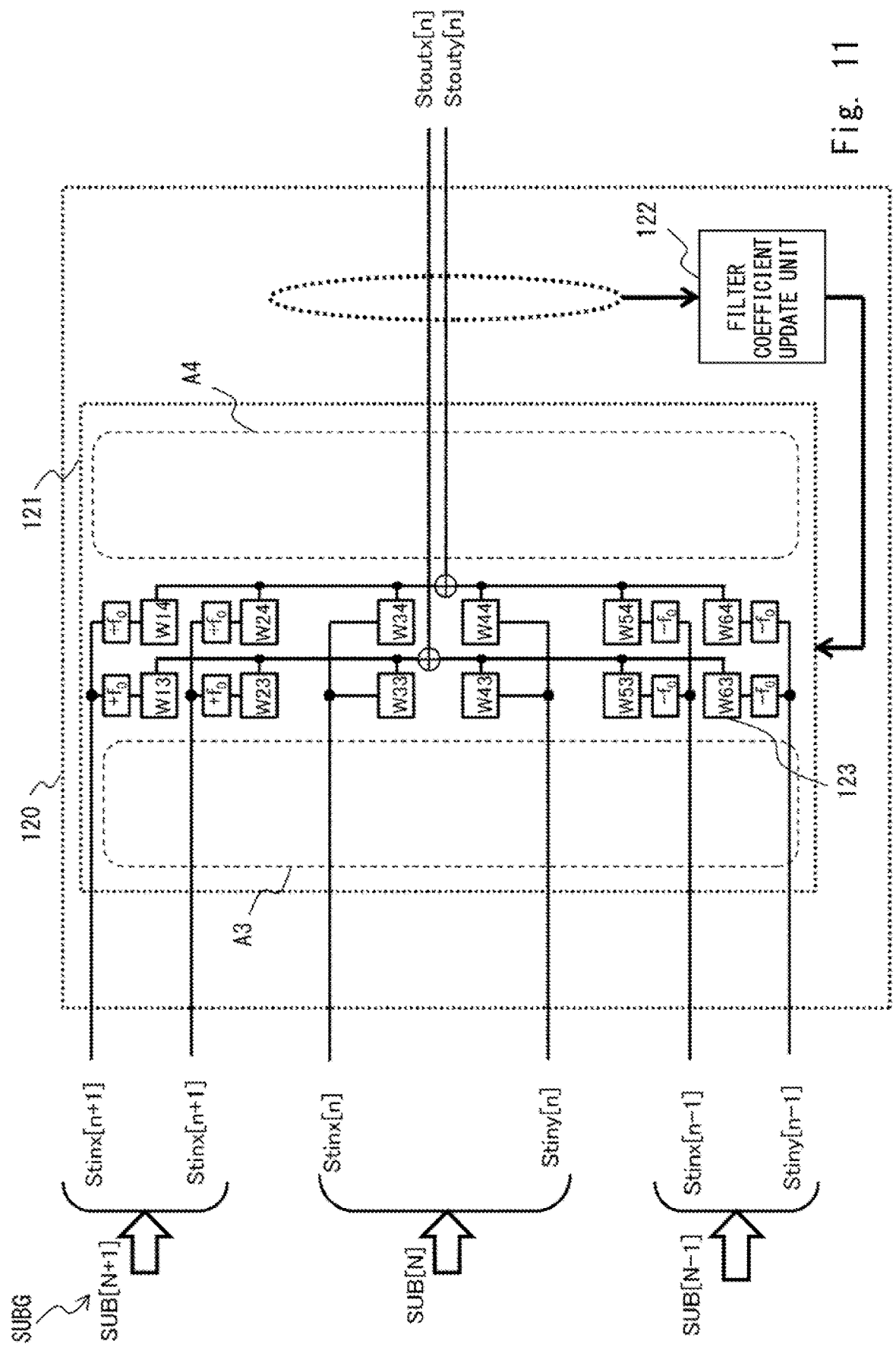
FIG. 11 is a configuration diagram showing a configuration of a TDE-MIMO equalizer according to the first example embodiment.

FIG. 11 shows a specific configuration of the TDE-MIMO equalizer according to this example embodiment. As shown in FIG. 11, like in the comparative example, the TDE-MIMO equalizer 120 includes a TDE-MIMO core equalizer 121, the filter coefficient update unit 122, and the FIR filters 123. In this example, like in the case of the FDE-MIMO equalizer 110 described above, it is assumed that the subcarrier signal SUB[N] is the target subcarrier signal, and the subcarrier signals SUB[N−1], SUB[N], and SUB[N+1] are the subcarrier signals SUBG. The TDE-MIMO equalizer 120 inputs the subcarrier signal SUB[N] and the adjacent subcarrier signals SUB[N+1] and SUB[N−1] on which the FDE-MIMO equalizer 110 has performed FDE-MIMO equalization processing, and outputs the subcarrier signal SUB[N] subjected to the FDE-MIMO equalization processing. Further, each subcarrier signal includes an X-polarized wave component and a Y-polarized wave component.

The configuration of the TDE-MIMO core equalizer differs from that of the comparative example. That is, the TDE-MIMO core equalizer 121 has a 6×2 filter structure different from that of the comparative example, and the TDE-MIMO equalizer 120 is a 6×2 FDE-MIMO equalizer. In other words, the TDE-MIMO core equalizer 121 performs the TDE-MIMO equalization processing on each of the subcarrier signals to be input (Stinx[n+1], Stiny[n+1], Stinx[n], Stiny[n], Stinx[n−1], and Stiny[n−1]) in the time domain, and outputs the subcarrier signals (Sfoutx[n] and Sfouty[n]) in the time domain that have been subjected to the TDE-MIMO equalization processing. Therefore, some of the FIR filters 123 that constitute the TDE-MIMO equalizer in the comparative example have been deleted in this example embodiment.

As described above, in this example embodiment, respective subcarrier signals are processed in parallel by the FDE-MIMO equalizer and the TDE-MIMO equalizer. As a result, the TDE-MIMO equalizer 120 outputs only the target subcarrier signal. Therefore, the FIR filters 123 other than those used for the output of core subcarrier signals are deleted in this example. By doing the above, the number of the FIR filters 123 in this example can be 24 less than the number of FIR filters in the comparative example.

Specifically, the TDE-MIMO core equalizer 121 includes only 12 of the FIR filters 123 respectively having the tap coefficients W13, W14, W23, W24, W33, W34, W43, W44, W53, W54, W63, and W64. The FIR filters 123 respectively having the tap coefficients W13, W14, H23, W23, and H24 W24 serve as circuits for inputting the subcarrier signal SUB [N+1]. The FIR filters 123 respectively having the tap coefficients W33, W34, W43, and W44 serve as circuits for inputting the subcarrier signal SUB[N]. The FIR filters 123 respectively having the tap coefficients W53, H54, W63, and W64 serve as circuits for inputting the subcarrier signal SUB[N−1].

Further, like in the comparative example, the FIR filters 123 respectively having the tap coefficients W13, W14, W23, W24, W33, W34, W43, W44, W53, W54, W63, and W64 serve as circuits (TDE-MIMO equalization circuits) for inputting the subcarrier signal SUB[N+1] (a first subcarrier signal), the subcarrier signal SUB[N] (a second subcarrier signal), and the subcarrier signal SUB[N−1] (a third subcarrier signal) and outputting the subcarrier signal SUB[N].

That is, like in the comparative example, the subcarrier signal SUB[N] and the adjacent subcarrier signals SUB[N+1] and SUB[N−1] are used in the MIMO equalization processing of the subcarrier signal SUB[N]. Therefore, the FIR filters 123 (the tap coefficients W13, W14, W23, W24, W33, W34, W43, W44, W53, W54, W63, and W64) used for the calculation of the subcarrier signal SUB[N] are not deleted. In other words, the subcarrier signals SUB[N+1] and SUB[N−1] are added to the subcarrier signal SUB[N], whereby the subcarrier signal SUB[N] that has been subjected to TDE-MIMO processing is generated. Then, the FIR filters (the tap coefficients W11, W12, W21, W22, W31, W32, W41, W42, W51, W52, W61, and W62) shown in an area A3 and the FIR filters (the tap coefficients W15, W16, W25, W26, W35, W36, W45, W46, W55, W56, W65, and W66) shown in an area A4, all of which FIR filters are not used for the calculation of the subcarrier signal SUB[N], are deleted. Thus, by using only the minimum required number of circuits, the MIMO equalization processing can be performed using the subcarrier signals SUB[N+1] and SUB[N−1] that are vertically adjacent to the subcarrier signal SUB[N] in the frequency domain.

Note that the tap coefficients of the FIR filters 123 are sequentially updated by the filter coefficient update unit 122 so that they are optimum coefficients by calculating errors with use of a blind equalization algorithm such as CMA. The tap coefficients are thereby optimized so that crosstalk occurring between subcarriers cancels each other out, which allows original subcarrier signals to be demodulated from the subcarrier signals overlapping on a frequency axis.

As described above, in this example embodiment, in the optical reception apparatus of the optical transmission system that performs optical transmission by wavelength-division multiplexing a subcarrier signal, MIMO equalization processing is performed for each target subcarrier signal by focusing on the fact that crosstalk is dominantly affected by adjacent subcarrier signals, whereby the circuit size of a MIMO equalizer can be reduced.

A plurality of FDE-MIMO equalizers and a plurality of TDE-MIMO equalizers of a hybrid MIMO equalizer perform the MIMO equalization processing for each subcarrier signal group by inputting the subcarrier signal group including a target subcarrier signal and adjacent subcarrier signals. Although the FDE-MIMO equalizer is, for example, a 6×6 FDE-MIMO equalizer, the circuit size can be reduced by deleting linear equalization processing between subcarriers that hardly affects crosstalk. Further, the TDE-MIMO equalizer inputs a subcarrier signal group including a target subcarrier and adjacent subcarriers and outputs only the target subcarrier, and therefore, for example, the linear equalization processing can be performed by a 6×2 TDE-MIMO equalizer and the circuit size can be thus reduced.

Figure 12:
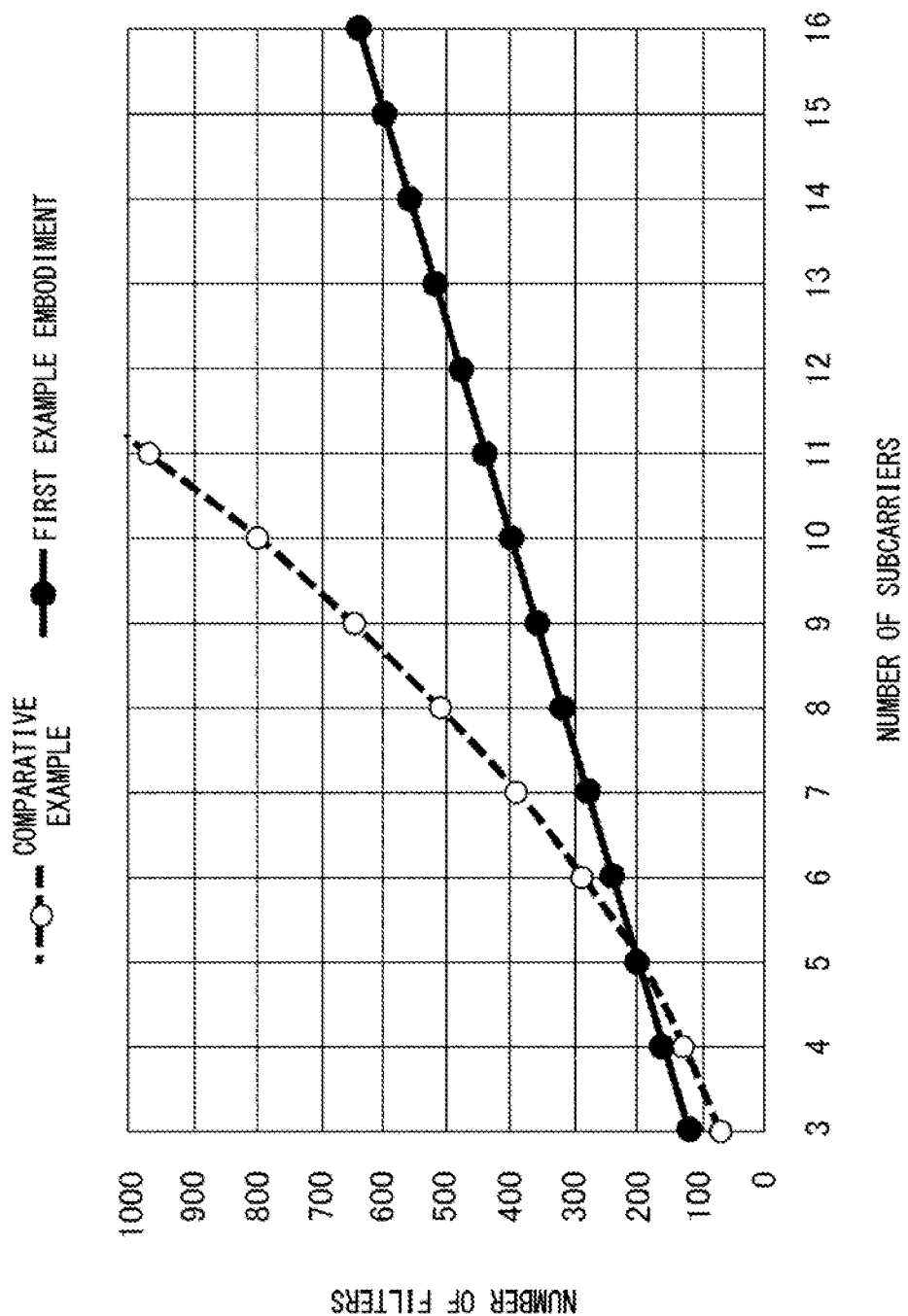
FIG. 12 is a graph for explaining the effect of the first example embodiment.

FIG. 12 is a graph showing the circuit sizes of the respective MIMO equalizers according to the comparative example and this example embodiment. When the number of subcarriers is N, the number of filters (the number of filter coefficient multipliers) required for the FDE-MIMO equalizer is $(2N)^2$ in the comparative example, and is N×28 in this example embodiment. The number of filters required for the TDE-MIMO equalizer is $(2N)^2$ in the comparative example, and is N×12 in this example embodiment. Thus, as shown in FIG. 12, in the comparative example, the number of filters increases exponentially as the number of subcarriers increases. However, in this example embodiment, the number of filters increases only at a constant rate even when the number of subcarriers increases. Therefore, as the number of subcarriers increases, the number of filters in this example embodiment can be reduced so that it is less than that of the comparative example. In this example, in a case of eight subcarriers, the number of filters can be reduced by 37.5%.

Further, when the circuit implementation in the comparative example is compared with that in this example embodiment, it is seen that the number of filters increases by the square of the number of subcarriers in the comparative example as described above, so that the wiring inside the circuit becomes complicated with the increase of the number of subcarriers. Therefore, the circuit size is further increased in association with the circuit implementation. On the other hand, in this example embodiment, although the number of filters increases in proportion to the number of subcarriers, only an independent circuit for each subcarrier increases even when the number of subcarriers increases. Therefore, the circuit size which is increased in association with the circuit implementation is fixed. That is, in this example embodiment, since the MIMO equalizer can be implemented only by arranging a plurality of MIMO equalizers for each subcarrier, it is possible to relax the restrictions on the circuit implementation (a so-called scale-out is achieved).

Second Example Embodiment

In a second example embodiment, as another configuration example of the hybrid equalizer of the optical reception apparatus according to the first example embodiment, a configuration example of a hybrid equalizer that processes a subcarrier signal at the end part of the frequency domain of a channel signal will be described.

<FDE-MIMO Equalizer According to Second Example Embodiment>

Figure 13:
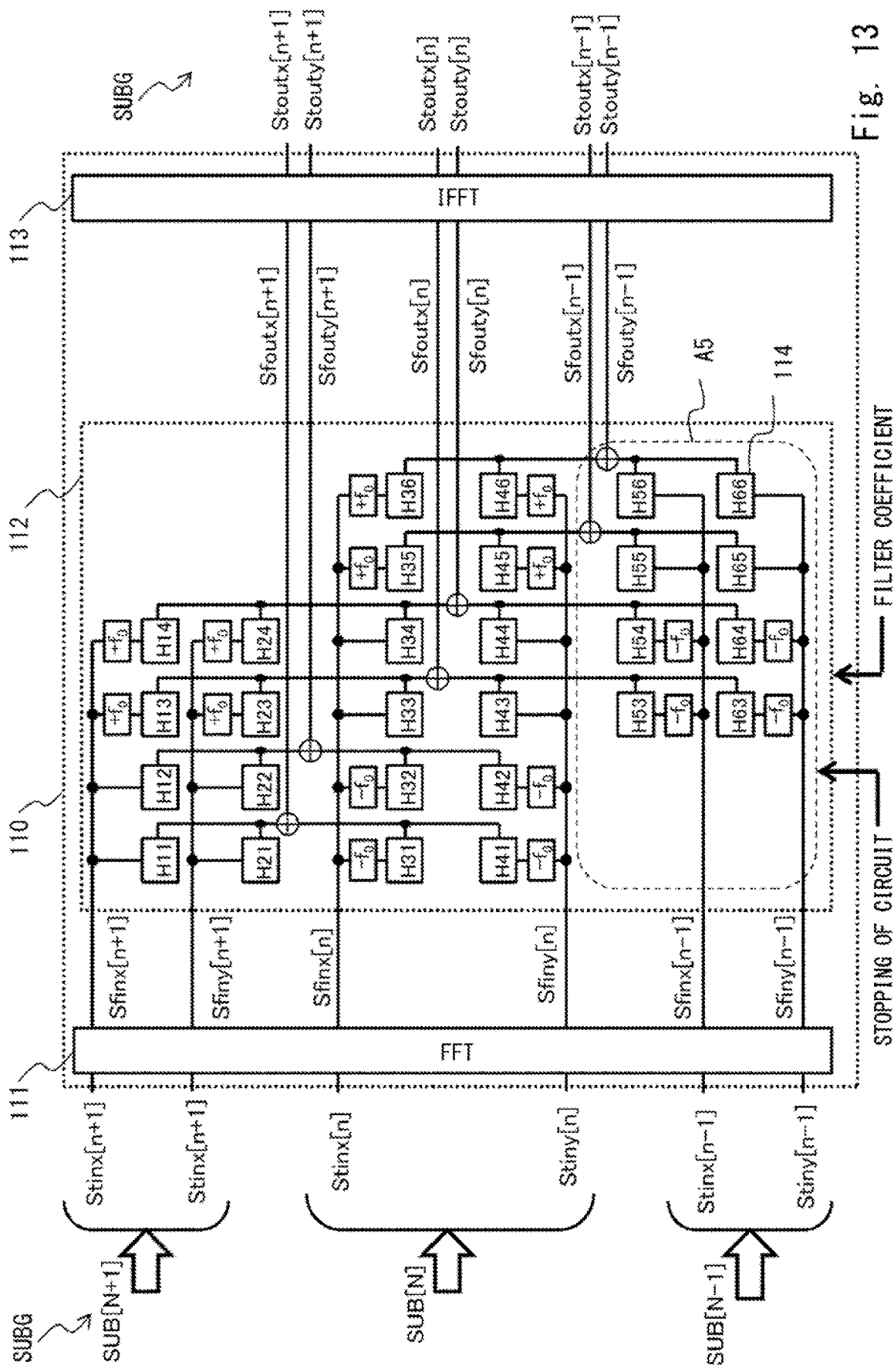
FIG. 13 is a configuration diagram showing a configuration of an FDE-MIMO equalizer according to a second example embodiment.
Figure 14:
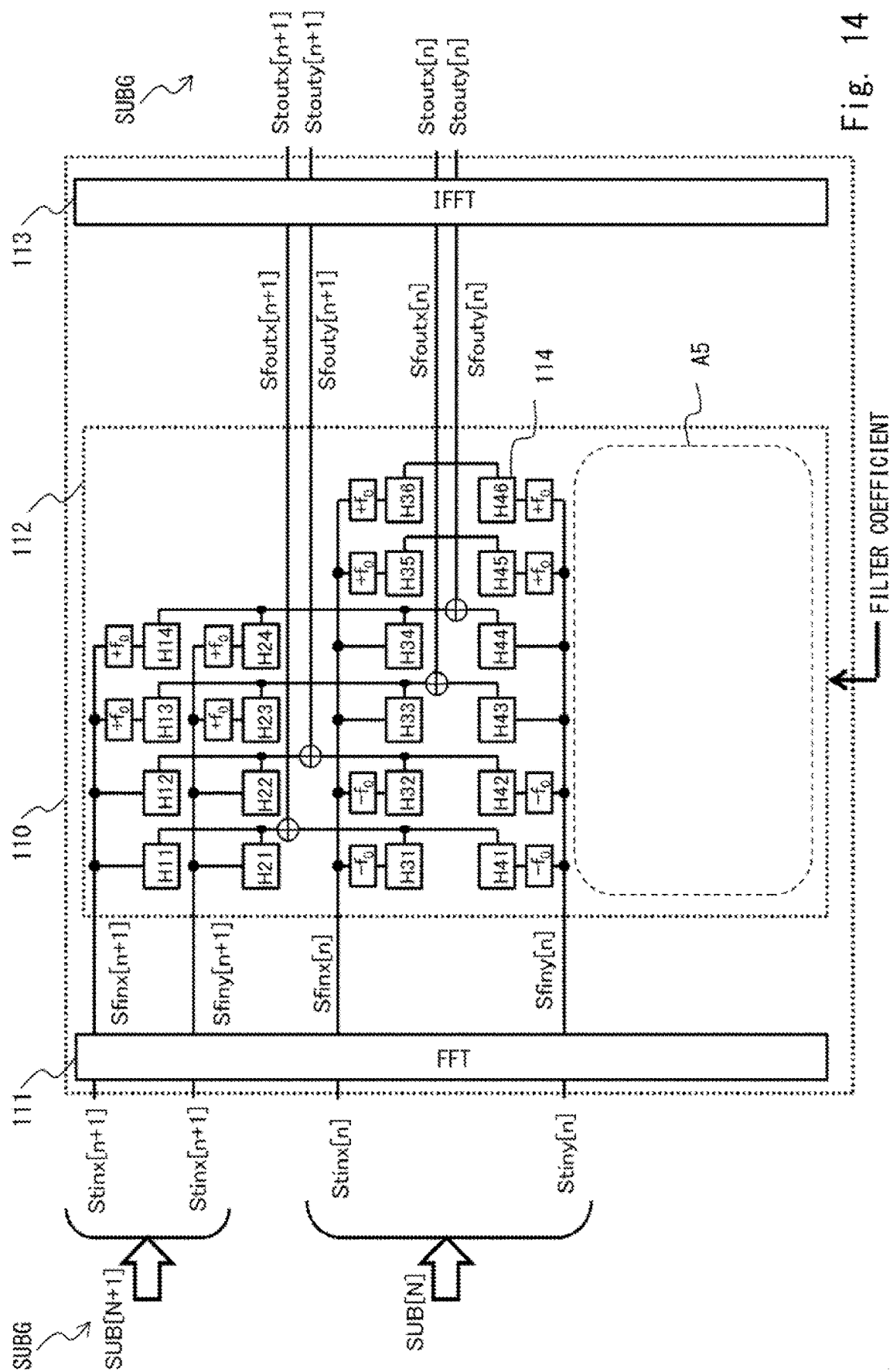
FIG. 14 is a configuration diagram showing a configuration of the FDE-MIMO equalizer according to the second example embodiment.

Each of FIGS. 13 and 14 shows a specific configuration of an FDE-MIMO equalizer according to this example embodiment. Each of FIGS. 13 and 14 shows a configuration example of the FDE-MIMO equalizer such as the FDE-MIMO equalizer 110-1 or 110-5. The basic configuration thereof is similar to that of the FDE-MIMO equalizer 110 described in the first example embodiment.

In the FDE-MIMO equalizer 110-1 or 110-5, since the subcarrier signals at the frequency end of the channel signal are processed, a two-subcarrier input×two-subcarrier output is set. For example, the FDE-MIMO equalizer 110-1 inputs the subcarrier signals SUB1 and SUB2 and outputs the subcarrier signals SUB1 and SUB2 that have been subjected to FDE-MIMO equalization processing. The FDE-MIMO equalizer 110-5 inputs the subcarrier signals SUB4 and SUB5 and outputs the subcarrier signals SUB4 and SUB5 that have been subjected to the FDE-MIMO equalization processing.

Thus, when the 6×6 FDE-MIMO equalizer described in the first example embodiment is used as it is, the output of the FDE-MIMO equalizer becomes an unstable signal. Therefore, in the example of FIG. 13, when there is a subcarrier signal that is not used (when a certain subcarrier signal is not input), the filter coefficient multiplier 114 of the subcarrier signal that is not used is controlled (configured) so that it does not operate. For example, the circuit operation of the corresponding filter coefficient multiplier 114 may be stopped, or the filter coefficient of the filter coefficient multiplier 114 may be set to zero. In this example, since the subcarrier signals SUB[N+1] and SUB[N] are used while the subcarrier signal SUB[N−1] is not used, the circuits of the filter coefficient multipliers 114 (the filter coefficients H53, H54, H55, H56, H63, H64, H65, and H66) for calculating the subcarrier signal SUB[N−1] shown in an area A5 are stopped or the filter coefficients are set to zero. Further, the circuits of the filter coefficient multipliers 114 (the filter coefficients H35, H36, H45, and H46) to which the subcarrier signal SUB[N] is input may be stopped or the filter coefficients may be set to zero.

Note that stopping of a circuit and the zero setting of a filter coefficient may be configured in advance in a fixed manner, or may be configured dynamically in accordance with a subcarrier signal. For example, a monitor circuit for monitoring signals input to the FDE-MIMO equalizer may be provided, to thereby control the circuit operation of a subcarrier in which no signal is detected in accordance with the spectrum of the monitored input signal.

Further, the circuit operation may be controlled as shown in FIG. 13, or circuits that are not used may be deleted as shown in FIG. 14. In the example of FIG. 14, the filter coefficient multipliers 114 (the filter coefficients H53, H54, H55, H56, H63, H64, H65, and H66) of the subcarrier signals that are not used and are shown in the area A5 are deleted. That is, the FDE-MIMO core circuit 112 may include only 20 of the filter coefficient multipliers 114 respectively having the filter coefficients H11 to H14, H21 to H24, H31 to H36, and H41 to H46. Further, the filter coefficient multipliers 114 (the filter coefficients H35, H36, H45, and H46) to which the subcarrier signal SUB[N] is input may be deleted. That is, the FDE-MIMO core circuit 112 may include only 16 of the filter coefficient multipliers 114 respectively having the filter coefficients H11 to H14, H21 to H24, H31 to H34, and H41 to H44.

<TDE-MIMO Equalizer According to Second Example Embodiment>

Figure 15:
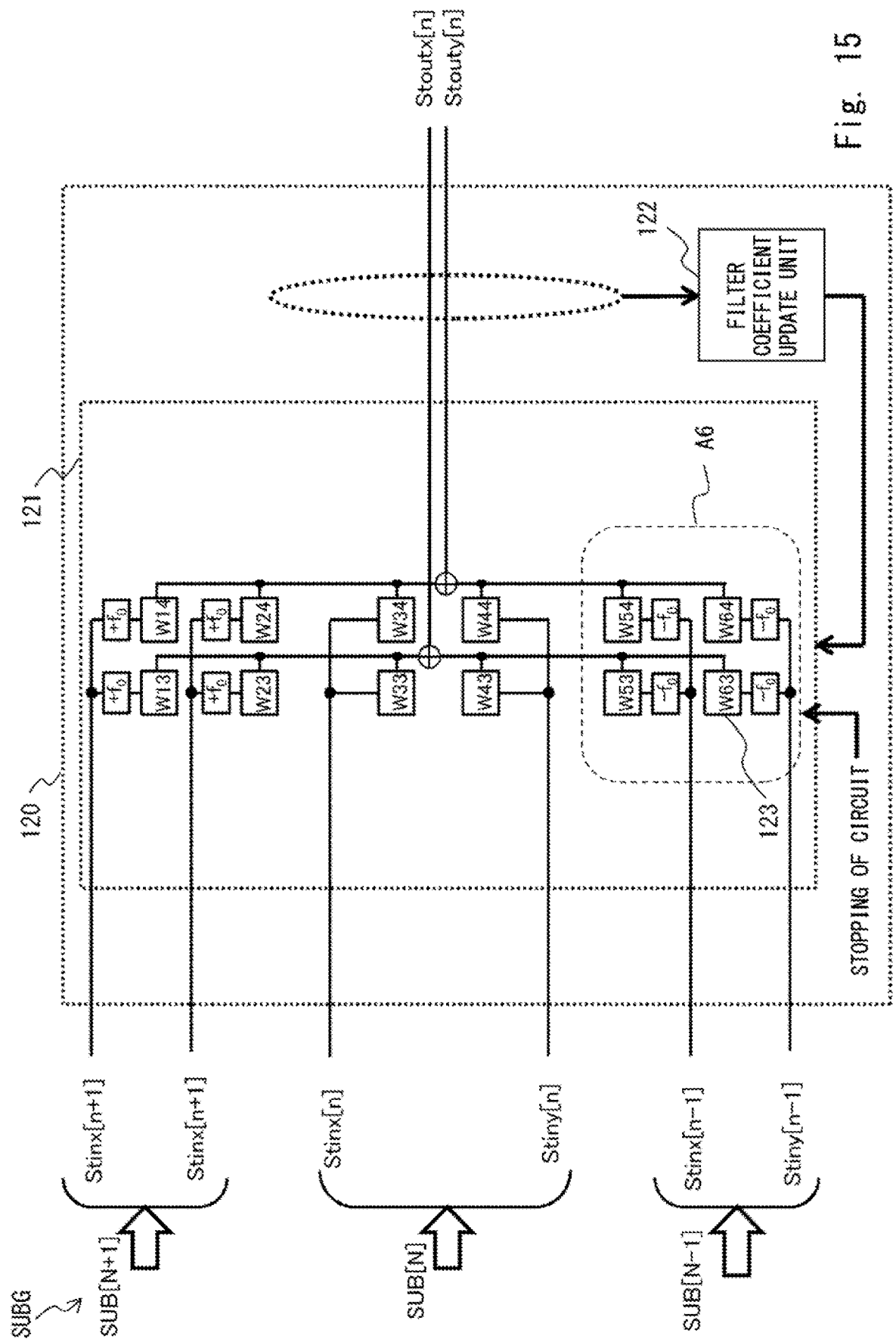
FIG. 15 is a configuration diagram showing a configuration of a TDE-MIMO equalizer according to the second example embodiment.

Each of FIGS. 15 and 16 shows a specific configuration of the TDE-MIMO equalizer according to this example embodiment. Each of FIGS. 15 and 16 shows a configuration example of the TDE-MIMO equalizer such as the TDE-MIMO equalizer 120-1 or 120-5. The basic configuration thereof is similar to that of the TDE-MIMO equalizer 120 described in the first example embodiment.

In the TDE-MIMO equalizer 120-1 or 120-5, since the subcarrier signals at the frequency end of the channel signal are processed, a two-subcarrier input×one-subcarrier output is set. For example, the TDE-MIMO equalizer 120-1 inputs the subcarrier signals SUB1 and SUB2 and outputs the subcarrier signal SUB1 that has been subjected to TDE-MIMO equalization processing. The TDE-MIMO equalizer 120-5 inputs the subcarrier signals SUB4 and SUB5 and outputs the subcarrier signal SUB5 that has been subjected to the TDE-MIMO equalization processing.

Thus, when the 6×2 TDE-MIMO equalizer described in the first example embodiment is used as it is, the output of the TDE-MIMO equalizer becomes an unstable signal. Therefore, in the example of FIG. 15, when there is a subcarrier signal that is not used (when a certain subcarrier signal is not input), the FIR filter 123 of the subcarrier signal that is not used is controlled (configured) so that it does not operate. For example, the circuit operation of the corresponding FIR filter 123 may be stopped, or the tap coefficient of the FIR filter 123 may be set to zero. In this example, since the subcarrier signals SUB[N+1] and SUB[N] are used while the subcarrier signal SUB[N−1] is not used, the circuits of the FIR filters 123 (the tap coefficients W53, W54, W63, and W64) for calculating the subcarrier signal SUB [N−1] shown in an area A6 are stopped or the tap coefficients are set to zero. Note that, like in the case of the FDE-MIMO equalizer according to this example embodiment described above, stopping of a circuit and the zero setting of a tap coefficient may be configured in advance in a fixed manner, or may be configured dynamically in accordance with a subcarrier signal.

Further, the circuit operation may be controlled as shown in FIG. 15, or circuits that are not used may be deleted as shown in FIG. 16. That is, in the example of FIG. 16, the FIR filters 123 (the tap coefficients W53, W54, W63, and W64) of the subcarrier signals that are not used and are shown in the area A6 are deleted. That is, the TDE-MIMO core equalizer 121 may include only eight FIR filters 123 respectively having the tap coefficients W13, W14, W23, W24, W33, W34, W43, and W44.

As described above, in the FDE-MIMO equalizer and the TDE-MIMO equalizer, each of which processes a subcarrier signal at the end part of the frequency domain of a channel signal, the operation of the circuit that is not used may be controlled. By doing the above, it is possible to stabilize the circuit operation while using the same circuit configuration as other FDE-MIMO equalizers and TDE-MIMO equalizers. Further, circuits that are not used in the FDE-MIMO equalizer and the TDE-MIMO equalizer may be further deleted. By doing the above, it is possible to further reduce the circuit size.

Note that the present disclosure is not limited to the above-described example embodiments and may be changed as appropriate without departing from the spirit of the present disclosure. For example, the circuit described as the comparative example may be combined with the circuits described as the example embodiments. The FDE-MIMO equalizer according to the comparative example may be combined with the TDE-MIMO equalizers according to the example embodiments.

The whole or part of the example embodiments disclosed above can be described as, but not limited to, the following supplementary notes.

(Supplementary Note A1)

A WDM optical transmission system configured to, when a subcarrier signal to be multiplexed on a frequency axis is a single polarization signal and the number of subcarrier signals that are successively multiplexed to respective frequencies above and below a target subcarrier signal is N (N is a natural number), sequentially perform reception processing of (2N+1)×(2N+1) frequency-domain MIMO equalization and (2N+1)×1 time-domain MIMO equalization.

(Supplementary Note A2)

The WDM optical transmission system according to Supplementary note A1, wherein the subcarrier signal is a polarization multiplexed signal, and an order of MIMO equalization is increased by the number of times of polarization multiplexing.

(Supplementary Note A3)

The WDM optical transmission system according to Supplementary note A1 or A2, wherein the number N of the subcarrier signals to be multiplexed is one.

(Supplementary Note A4)

A reception apparatus of a WDM optical transmission system configured to, when a subcarrier signal to be multiplexed on a frequency axis is a single polarization signal and the number of subcarrier signals that are successively multiplexed to respective frequencies above and below a target subcarrier signal is N (N is a natural number), perform linear equalization by coupling a (2N+1)×(2N+1) frequency-domain MIMO equalizer to a (2N+1)×1 time-domain MIMO equalizer.

(Supplementary Note A5)

The reception apparatus of the wavelength-division multiplexing optical transmission system according to Supplementary note A4, wherein the subcarrier signal is a polarization multiplexed signal, and an order of MIMO equalization is increased by the number of times of polarization multiplexing.

(Supplementary Note A6)

The reception apparatus of the WDM optical transmission system according to Supplementary note A4 or A5, wherein the number N of the subcarrier signals to be multiplexed is one.

(Supplementary Note B1)

An optical signal processing circuit comprising:
 a frequency-domain MIMO equalizer configured to generate, based on continuous subcarrier signals including a target subcarrier signal in an optical multicarrier signal to be received, the continuous subcarrier signals that have been subjected to frequency-domain MIMO equalization processing; and
 a time-domain MIMO equalizer configured to generate, based on the continuous subcarrier signals that have been subjected to the frequency-domain MIMO equalization processing, the target subcarrier signal that has been subjected to time-domain MIMO equalization processing.

(Supplementary Note B2)

The optical signal processing circuit according to Supplementary note B1, wherein
 the continuous subcarrier signals include N subcarrier signals (N is a natural number) that are successively multiplexed to respective frequencies above and below the target subcarrier signal,
 an input×output of the frequency-domain MIMO equalizer is (2N+1)×(2N+1), and
 an input×output of the time-domain MIMO equalizer is (2N+1)×1.

(Supplementary Note B3)

The optical signal processing circuit according to Supplementary note B2, wherein
 the N subcarrier signals are polarized and multiplexed to respective M polarization signals,
 the input×output of the frequency-domain MIMO equalizer is M(2N+1)×M(2N+1), and
 the input×output of the time-domain MIMO equalizer is M(2N+1)×m.

(Supplementary Note B4)

The optical signal processing circuit according to Supplementary note B2 or B3, wherein the N is one.

(Supplementary Note B5)

The optical signal processing circuit according to any one of Supplementary notes B1 to B4, wherein the continuous subcarrier signals include a subcarrier signal that causes crosstalk to the target subcarrier signal.

(Supplementary Note B6)

The optical signal processing circuit according to any one of Supplementary notes B1 to B5, wherein the continuous subcarrier signals include a subcarrier signal that overlaps the target subcarrier signal in a frequency domain.

(Supplementary Note B7)
The optical signal processing circuit according to any one of Supplementary notes B1 to B6, wherein the continuous subcarrier signals include a subcarrier signal adjacent to the target subcarrier signal in the frequency domain.

(Supplementary Note B8)
The optical signal processing circuit according to any one of Supplementary notes B1 to B7, wherein
the continuous subcarrier signals include first to third subcarrier signals that are continuous on a frequency axis, and
the frequency-domain MIMO equalizer comprises:
a first frequency-domain processing circuit configured to generate the first subcarrier signal that has been subjected to the frequency-domain MIMO equalization processing based on the first subcarrier signal and the second subcarrier signal;
a second frequency-domain processing circuit configured to generate the second subcarrier signal that has been subjected to the frequency-domain MIMO equalization processing based on the first subcarrier signal, the second subcarrier signal, and the third subcarrier signal; and
a third frequency-domain processing circuit configured to generate the third subcarrier signal that has been subjected to the frequency-domain MIMO equalization processing based on the second subcarrier signal and the third subcarrier signal.

(Supplementary Note B9)
The optical signal processing circuit according to Supplementary note B8, wherein when the third subcarrier signal is not input, the frequency-domain MIMO equalizer controls the third frequency-domain processing circuit so that it does not operate.

(Supplementary Note B10)
The optical signal processing circuit according to Supplementary note B9, wherein when the third subcarrier signal is not input, the frequency-domain MIMO equalizer stops an operation of the third frequency-domain processing circuit or sets a calculation coefficient of the third frequency-domain processing circuit to zero.

(Supplementary Note B11)
The optical signal processing circuit according to any one of Supplementary notes B1 to B7, wherein
the continuous subcarrier signals include first to third subcarrier signals that are continuous on a frequency axis, and
the time-domain MIMO equalizer comprises a time-domain processing circuit configured to generate the second subcarrier signal that has been subjected to the time-domain MIMO equalization processing based on the first subcarrier signal, the second subcarrier signal, and the third subcarrier signal.

(Supplementary Note B12)
The optical signal processing circuit according to Supplementary note B11, wherein when the third subcarrier signal is not input, the time-domain MIMO equalizer controls a circuit configured to calculate the third subcarrier signal among the time-domain processing circuits so that it does not operate.

(Supplementary Note B13)
The optical signal processing circuit according to Supplementary note B12, wherein when the third subcarrier signal is not input, the frequency-domain MIMO equalizer stops an operation of the circuit configured to calculate the third subcarrier signal or sets a calculation coefficient of the circuit configured to calculate the third subcarrier signal to zero.

(Supplementary Note B14)
An optical reception apparatus comprising an optical receiver configured to receive an optical multicarrier signal, a plurality of frequency-domain MIMO equalizers, and a plurality of time-domain MIMO equalizers, wherein
each of the plurality of frequency-domain MIMO equalizers generates, based on continuous subcarrier signals including a target subcarrier signal selected for each of the frequency-domain MIMO equalizers in the optical multicarrier signal to be received, the continuous subcarrier signals that have been subjected to frequency-domain MIMO equalization processing, and
each of the plurality of time-domain MIMO equalizers generates, based on the continuous subcarrier signals that have been subjected to the frequency-domain MIMO equalization processing, the target subcarrier signal that has been subjected to time-domain MIMO equalization processing.

(Supplementary Note B15)
The optical reception apparatus according to Supplementary note B14, wherein
the continuous subcarrier signals include N subcarrier signals (N is a natural number) that are successively multiplexed to respective frequencies above and below the target subcarrier signal,
an input×output of each of the plurality of frequency-domain MIMO equalizers is (2N+1)×(2N+1), and
an input×output of each of the plurality of time-domain MIMO equalizers is (2N+1)×1.

(Supplementary Note B16)
An optical signal processing method comprising:
generating, based on continuous subcarrier signals including a target subcarrier signal in an optical multicarrier signal to be received, the continuous subcarrier signals that have been subjected to frequency-domain MIMO equalization processing; and
generating, based on the continuous subcarrier signals that have been subjected to the frequency-domain MIMO equalization processing, the target subcarrier signal that has been subjected to time-domain MIMO equalization processing.

(Supplementary Note B17)
The optical signal processing method according to Supplementary note B16, wherein
the continuous subcarrier signals include N subcarrier signals (N is a natural number) that are successively multiplexed to respective frequencies above and below the target subcarrier signal,
an input×output of the frequency-domain MIMO equalization processing is (2N+1)×(2N+1), and
an input×output of the time-domain MIMO equalization processing is (2N+1)×1.

Although the present invention has been described with reference to the example embodiments, the present invention is not limited to the above-described example embodiments. Various changes that may be understood by those skilled in the art may be made to the configurations and details of the present invention within the scope of the invention.

This application is based upon and claims the benefit of priority from Japanese patent application No. 2019-186763, filed on Oct. 10, 2019, the disclosure of which is incorporated herein in its entirety by reference.

REFERENCE SIGNS LIST 1, 1a, 1b OPTICAL SIGNAL PROCESSING CIRCUIT
2, 2a, 2b FDE-MIMO EQUALIZER
3, 3a, 3b TDE-MIMO EQUALIZER
4 OPTICAL RECEIVER
5 OPTICAL RECEPTION APPARATUS
6 WAVELENGTH-DIVISION MULTIPLEXING OPTICAL TRANSMISSION SYSTEM
10 OPTICAL TRANSMISSION APPARATUS
11 OPTICAL TRANSMITTER
12 MULTIPLEXER
20 OPTICAL RECEPTION APPARATUS
21 DEMULTIPLEXER
22 OPTICAL RECEIVER
31 OPTICAL FIBER TRANSMISSION LINE
32 ROADM DEVICE
100 HYBRID MIMO EQUALIZER
110 FDE-MIMO EQUALIZER
111 FFT CIRCUIT
112 FDE-MIMO CORE CIRCUIT
113 IFFT CIRCUIT
114 FILTER COEFFICIENT MULTIPLIER
120 TDE-MIMO EQUALIZER
121 TDE-MIMO CORE EQUALIZER
122 FILTER COEFFICIENT UPDATE UNIT
123 FIR FILTER

What is claimed is:

1. An optical signal processing circuit comprising:
a frequency-domain MIMO equalizer configured to generate, based on continuous subcarrier signals including a target subcarrier signal in an optical multicarrier signal to be received, the continuous subcarrier signals that have been subjected to frequency-domain MIMO equalization processing; and
a time-domain MIMO equalizer configured to generate, based on the continuous subcarrier signals that have been subjected to the frequency-domain MIMO equalization processing, the target subcarrier signal that has been subjected to time-domain MIMO equalization processing, wherein
the continuous subcarrier signals include N subcarrier signals that are successively multiplexed to respective frequencies above and below the target subcarrier signal, where N is a natural number,
an input×output of the frequency-domain MIMO equalizer is $(2N+1)\times(2N+1)$, and an input output of the time-domain MIMO equalizer is $(2N+1)\times 1$.

2. The optical signal processing circuit according to claim 1, wherein
the N subcarrier signals are polarized and multiplexed to respective M polarization signals,
the input×output of the frequency-domain MIMO equalizer is $M(2N+1)\times M(2N+1)$, and
the input×output of the time-domain MIMO equalizer is $M(2N+1)\times M$.

3. The optical signal processing circuit according to claim 1, wherein N is one.

4. The optical signal processing circuit according to claim 1, wherein the continuous subcarrier signals include a subcarrier signal that causes crosstalk to the target subcarrier signal.

5. The optical signal processing circuit according to claim 1, wherein the continuous subcarrier signals include a subcarrier signal that overlaps the target subcarrier signal in a frequency domain.

6. The optical signal processing circuit according to claim 1, wherein the continuous subcarrier signals include a subcarrier signal adjacent to the target subcarrier signal in the frequency domain.

7. The optical signal processing circuit according to claim 1, wherein
the continuous subcarrier signals include first to third subcarrier signals that are continuous on a frequency axis, and
the frequency-domain MIMO equalizer comprises:
a first frequency-domain processing circuit configured to generate the first subcarrier signal that has been subjected to the frequency-domain MIMO equalization processing based on the first subcarrier signal and the second subcarrier signal;
a second frequency-domain processing circuit configured to generate the second subcarrier signal that has been subjected to the frequency-domain MIMO equalization processing based on the first subcarrier signal, the second subcarrier signal, and the third subcarrier signal; and
a third frequency-domain processing circuit configured to generate the third subcarrier signal that has been subjected to the frequency-domain MIMO equalization processing based on the second subcarrier signal and the third subcarrier signal.

8. The optical signal processing circuit according to claim 7, wherein when the third subcarrier signal is not input, the frequency-domain MIMO equalizer controls the third frequency-domain processing circuit so that the third frequency-domain processing circuit does not operate.

9. The optical signal processing circuit according to claim 8, wherein when the third subcarrier signal is not input, the frequency-domain MIMO equalizer stops operation of the third frequency-domain processing circuit or sets a calculation coefficient of the third frequency-domain processing circuit to zero.

10. The optical signal processing circuit according to claim 1, wherein
the continuous subcarrier signals include first to third subcarrier signals that are continuous on a frequency axis, and
the time-domain MIMO equalizer comprises a time-domain processing circuit configured to generate the second subcarrier signal that has been subjected to the time-domain MIMO equalization processing based on the first subcarrier signal, the second subcarrier signal, and the third subcarrier signal.

11. The optical signal processing circuit according to claim 10, wherein when the third subcarrier signal is not input, the time-domain MIMO equalizer controls a circuit configured to calculate the third subcarrier signal among the time-domain processing circuits so that the circuit does not operate.

12. The optical signal processing circuit according to claim 11, wherein when the third subcarrier signal is not input, the frequency-domain MIMO equalizer stops an operation of the circuit configured to calculate the third subcarrier signal or sets a calculation coefficient of the circuit configured to calculate the third subcarrier signal to zero.

13. An optical reception apparatus comprising an optical receiver configured to receive an optical multicarrier signal, a plurality of frequency-domain MIMO equalizers, and a plurality of time-domain MIMO equalizers, wherein each of the plurality of frequency-domain MIMO equalizers generates, based on continuous subcarrier signals including a target subcarrier signal selected for each of the frequency-domain MIMO equalizers in the optical multicarrier signal to be received, the continuous subcarrier signals that have been subjected to frequency-domain MIMO equalization processing, each of the plurality of time-domain MIMO equalizers generates, based on the continuous subcarrier signals that have been subjected to the frequency-domain MIMO equalization processing, the target subcarrier signal that has been subjected to time-domain MIMO equalization processing, the continuous subcarrier signals include N subcarrier signals that are successively multiplexed to respective frequencies above and below the target subcarrier signal, where N is a natural number, an input×output of each of the plurality of frequency-domain MIMO equalizers is (2N+1)×(2N+1), and an input×output of each of the plurality of time-domain MIMO equalizers is (2N+1)×1.

14. An optical signal processing method comprising:

generating, based on continuous subcarrier signals including a target subcarrier signal in an optical multicarrier signal to be received, the continuous subcarrier signals that have been subjected to frequency-domain MIMO equalization processing; and generating, based on the continuous subcarrier signals that have been subjected to the frequency-domain MIMO equalization processing, the target subcarrier signal that has been subjected to time-domain MIMO equalization processing, wherein the continuous subcarrier signals include N subcarrier signals that are successively multiplexed to respective frequencies above and below the target subcarrier signal, where N is a natural number, an input×output of the frequency-domain MIMO equalization processing is (2N+1)×(2N+1), and an input×output of the time-domain MIMO equalization processing is (2N+1)×1.

* * * * *